US011726971B2

(12) United States Patent
Avinoam et al.

(10) Patent No.: US 11,726,971 B2
(45) Date of Patent: Aug. 15, 2023

(54) METHODS AND SYSTEMS FOR STORING DATA IN A DATABASE

(71) Applicant: SQream, Tel Aviv (IL)

(72) Inventors: Roi Avinoam, Foster City, CA (US); Alon Brody, Cresskill, NJ (US); Ken Saggy, Atlit (IL)

(73) Assignee: SQream, Tel Aviv (IL)

( * ) Notice: Subject to any disclaimer, the term of this patent is extended or adjusted under 35 U.S.C. 154(b) by 0 days.

(21) Appl. No.: 17/372,971

(22) Filed: Jul. 12, 2021

(65) Prior Publication Data

US 2023/0008700 A1 Jan. 12, 2023

(51) Int. Cl.
*G06F 16/22* (2019.01)
(52) U.S. Cl.
CPC .................... *G06F 16/22* (2019.01)
(58) Field of Classification Search
CPC .. G06F 16/2264; G06F 16/285; G06F 16/164; G06F 16/22; G06F 16/258; G06F 16/211
See application file for complete search history.

(56) References Cited

U.S. PATENT DOCUMENTS

| | | | | |
|---|---|---|---|---|
| 5,787,432 A * | 7/1998 | LeTourneau | ............... | G06F 9/44 707/999.102 |
| 6,658,625 B1 * | 12/2003 | Allen | .................... | G06F 16/258 715/236 |
| 11,269,808 B1 * | 3/2022 | Yuan | ...................... | G06F 16/164 |
| 2013/0103654 A1 * | 4/2013 | McLachlan | ........... | G06F 16/245 707/692 |
| 2017/0068694 A1 * | 3/2017 | Brodt | ................... | G06F 16/2264 |
| 2017/0116266 A1 * | 4/2017 | Lahorani | ........... | G06F 16/24561 |
| 2019/0384846 A1 * | 12/2019 | Mathur | .............. | G06F 16/24524 |
| 2020/0296178 A1 * | 9/2020 | Coyle-Gilchrist | ...... | G06F 9/542 |
| 2021/0157857 A1 * | 5/2021 | Nogueira Dos Santos | ................. | G06N 20/00 |
| 2022/0075805 A1 * | 3/2022 | Goodsitt | ............... | G06F 16/285 |
| 2022/0237178 A1 * | 7/2022 | Sun | ....................... | G06F 16/221 |

* cited by examiner

*Primary Examiner* — Jorge A Casanova
(74) *Attorney, Agent, or Firm* — Oliff PLC

(57) ABSTRACT

A method comprising, by a processor and memory circuitry, obtaining a plurality of data comprising one or more groups of data, obtaining a data structure usable to determine, for at least a first data type and a second data type, a given data type which is adapted to represent at least both data of the first and second data types for their storage, for at least one given group of data which comprises one or more subsets of data $S_1$ to $S_N$:

for each subset of data $S_1$ to $S_N$, determining a data type which is adapted to represent said subset of data for its storage, and using the given data type of each subset of data $S_1$ to $S_N$ and the data structure to determine a common data type which is adapted to represent data belonging to subsets of data $S_1$ to $S_N$ for their storage.

20 Claims, 20 Drawing Sheets

METHODS AND SYSTEMS FOR STORING DATA IN A DATABASE

TECHNICAL FIELD

The presently disclosed subject matter relates to a solution for storing data in a database.

BACKGROUND

In various technical fields, users store data into one or more databases. For example, data representative of a plant, data collected from sensors, data collected for health monitoring, data representative of people's identity, data representative of clients, etc., can be stored in a database.

Over time, data to be stored can undergo various updates or modifications, which can cause difficulties in storing data in a database.

There is thus a need to propose new methods and systems for storing data in a database.

General Description

In accordance with certain aspects of the presently disclosed subject matter, there is provided a method comprising, by a processor and memory circuitry (PMC): obtaining a plurality of data to be stored in a database, wherein the plurality of data comprises one or more groups of data, obtaining a data structure informative of a plurality of data types according to which data can be represented for their storage, wherein the data structure is usable to determine, for at least a first data type and a second data type among said plurality of data types, a given data type which is adapted to represent at least both data of the first data type and data of the second data type for their storage, for at least one given group of data of the plurality of data, which comprises one or more subsets of data $S_1$ to $S_N$, for each subset of data $S_1$ to $S_N$, determining a given data type which is adapted to represent said subset of data for its storage, and using the given data type of each subset of data $S_1$ to $S_N$ and the data structure to determine a common data type which is adapted to represent all data, or at least part thereof, belonging to subsets of data $S_1$ to $S_N$ for their storage, thereby facilitating storing the given group of data in a database according to this common data type.

In addition to the above features, the server according to this aspect of the presently disclosed subject matter can optionally comprise one or more of features (i) to (viii) below, in any technically possible combination or permutation:

i. the data structure is usable to determine, for at least a first data type and a second data type among said plurality of data types, a given data type which is adapted to represent at least both data of the first data type and data of the second data type for their storage according to an efficiency criterion, wherein the efficiency criterion takes into account at least one of a storage size for representing both data of the first data type and data of the second data type in a database, and a query speed for searching data of the first data type and data of the second data type in a database;

ii. the method comprises storing data of the at least one given group of data according to the common data type;

iii. the method comprises, for at least one group of data which comprises a plurality of subsets of data $S_1$ to $S_N$: for each subset $S_i$, with i from 1 to N, performing a data type determination comprising: for subset $S_1$, determining a data type adapted to represent data of subset $S_1$ for its storage, for i>1, determining a data type adapted to represent data of subset $S_i$ for its storage, wherein, when this data type is not adapted to represent data of at least one subset $S_j$, with j<i, using the data structure to determine a new data type which is adapted to represent both data of subsets $S_i$ and $S_j$ for their storage, based on the data type determination, providing a common data type which is adapted to represent all data of subsets $S_1$ to $S_N$ for their storage;

iv. the method comprises, by the PMC: obtaining a database DB comprising at least one group of data $G_{DB}$, wherein a plurality of data DS comprises at least one group of data $G_{DS}$ which has to be stored together with data of the group of data $G_{DB}$, for the at least one group of data $G_{DS}$ of the plurality of data DS, which comprises a plurality of subsets of data $S_1$ to $S_N$: for each subset of data $S_1$ to $S_N$, determining a given data type which is adapted to represent said subset of data, and using the given data type of each subset of data $S_1$ to $S_N$ and the data structure to determine a common data type $DT'_{DB}$ which is adapted to represent group of data $G_{DS}$ and group of data $G_{DB}$, for storing group of data $G_{DS}$ and group of data $G_{DB}$ according to the common data type $DT'_{DB}$;

v. storing group of data $G_{DS}$ and group of data $G_{DB}$ according to the common data type $DT'_{DB}$ in a same group of data of the database DB.

vi. the method comprises, by the PMC, obtaining a database DB comprising at least one group of data $G_{DB}$ associated with a data type $DT_{DB}$, wherein a plurality of data DS comprises at least one group of data $G_{DS}$ which has to be stored together with group of data $G_{DB}$, and for the at least one group of data $G_{DS}$ which comprises a plurality of subsets of data $S_1$ to $S_N$, for each subset $S_i$, with i from 1 to N: determining a data type adapted to represent data of subset $S_i$ for its storage, wherein, when this data type is not adapted to represent data of a current common data type $DT_C$, using the data structure to determine a data type which is adapted to represent both data of subset $S_i$ and data of the current common data type $DT_C$, and assigning this data type as current common data type $DT_C$, wherein for i=1, the current common data type $DT_C$ is equal to $DT_{DB}$, and providing the current common data type $DT_C$ determined for i=N, which is adapted to represent group of data $G_{DB}$—and group of data $G_{DS}$, for their storage according to said current common data type $DT_C$;

vii. the method comprises storing group of data $G_{DS}$ and group of data $G_{DB}$ according to the current common data type $DT_C$ determined for i=N, thereby providing a database storing both group of data $G_{DS}$ and group of data $G_{DB}$ in a same group of data; and viii. the plurality of data types comprises at least one of Integer, Float, Date, Boolean, Time, Date and Time, String, and String with a predefined number of characters.

In accordance with certain aspects of the presently disclosed subject matter, there is provided a system comprising a processor and memory circuitry (PMC) configured to perform operations as described above.

In accordance with certain aspects of the presently disclosed subject matter, there is provided a non-transitory storage device readable by a machine, tangibly embodying a program of instructions executable by the machine to perform operations as described with reference to the method above.

In accordance with certain aspects of the presently disclosed subject matter, there is provided a method comprising, by a processor and memory circuitry (PMC): obtaining a plurality of data, wherein the plurality of data comprises one or more groups of data, obtaining a data structure informative of a plurality of data types according to which data can be represented for their storage, wherein the data structure is usable to determine, for at least a first data type and a second data type among said plurality of data types, a given data type which is adapted to represent at least both data of the first data type and data of the second data type for their storage, for at least one group of data $G_{DS}$ of the plurality of data, which comprises a plurality of subsets of data $S_1$ to $S_N$, for subset $S_1$, determining a current common data type $D_{TC}$ adapted to represent data of subset $S_1$ for its storage, repeatedly performing, for each subset $S_1$, with i from 2 to N, determining a data type adapted to represent data of subset $S_1$ for its storage, wherein, when this data type is not adapted to represent data of the current common data type $DT_C$, using the data structure to determine a given data type which is adapted to represent both data of subset $S_i$ and data of the current common data type $DT_C$, and assigning this given data type as current common data type $DT_C$, providing the current common data type $DT_C$ determined for i=N, which is adapted to represent data of group $G_{DS}$ for their storage, thereby facilitating storing the group of data $G_{DS}$ in a database according to this common data type.

According to some embodiments, the data structure comprises a tree comprising a plurality of nodes each associated with a data type, wherein a parent node of a given node corresponds to a data type which is broader than a data type of said given node, wherein each time the tree is searched or queried, a given node associated with a given data type output by the search is stored, wherein a subsequent search or query in the tree is allowed only in this given node or in parent nodes of this given node.

In accordance with certain aspects of the presently disclosed subject matter, there is provided a system comprising a processor and memory circuitry (PMC) configured to perform operations as described above.

In accordance with certain aspects of the presently disclosed subject matter, there is provided a non-transitory storage device readable by a machine, tangibly embodying a program of instructions executable by the machine to perform operations as described with reference to the method above.

In accordance with certain aspects of the presently disclosed subject matter, there is provided a method comprising, by a processor and memory circuitry (PMC): obtaining a plurality of data, wherein the plurality of data comprises one or more groups of data, obtaining a data structure informative of a plurality of data types according to which data can be represented for their storage, wherein the data structure is usable to determine, for at least a first data type and a second data type among said plurality of data types, a given data type which is adapted to represent at least both data of the first data type and data of the second data type for their storage, for at least one group of data $G_{DS}$ of the plurality of data, which comprises a plurality of subsets of data $S_1$ to $S_N$, for subset $S_1$, determining a current common data type $D_{TC}$ adapted to represent data of subset $S_1$ for its storage, repeatedly performing, for each subset $S_i$, with i from 1 to N, determining a data type adapted to represent data of subset $S_i$ for its storage, wherein when this data type is not adapted to represent data of a current common data type $DT_C$, using the data structure to determine a given data type which is adapted to represent both data of subset $S_i$ and data of the current common data type $DT_C$, and assigning this given data type as current common data type $DT_C$, wherein for i=1, the current common data type $DT_C$ corresponds to a data type $DT_{DB}$ of a group of data $G_{DB}$ of an existing database DB, providing the current common data type $DT_C$ determined for i=N, which is adapted to represent said group of data $G_{DB}$ and said group of data $G_{DB}$ for their storage according to said current common data type $DT_C$, thereby facilitating storing the group of data $G_{DB}$ with the group of data $G_{DB}$ of the database DB according to this common data type.

According to some embodiments, the data structure comprises a tree comprising a plurality of nodes each associated with a data type, wherein a parent node of a given node corresponds to a data type which is broader than a data type of said given node, wherein each time the tree is searched or queried, a given node associated with a given data type output by the search is stored, wherein a subsequent search or query in the tree is allowed only in this given node or in parent nodes of this given node.

In accordance with certain aspects of the presently disclosed subject matter, there is provided a system comprising a processor and memory circuitry (PMC) configured to perform operations as described above.

In accordance with certain aspects of the presently disclosed subject matter, there is provided a non-transitory storage device readable by a machine, tangibly embodying a program of instructions executable by the machine to perform operations as described with reference to the method above.

According to some embodiments, the proposed solution provides creation of databases in an automatic way.

According to some embodiments, the proposed solution detects, automatically, data type(s) of data provided by the user.

According to some embodiments, the proposed solution provides a database which evolves and adapts to new data having a different data type.

According to some embodiments, the proposed solution provides a database storing current data according to a current data type, and which is capable of automatically and efficiently absorbing new data belonging to a data type different from the current data type.

According to some embodiments, the proposed solution provides a database configured to automatically absorb data of different data types, while optimizing storage required for storing this data.

According to some embodiments, the proposed solution is transparent to the user who can freely modify format or type of data to be stored, without requiring from the user to reconfigure the database.

According to some embodiments, the proposed solution optimizes storage requirement.

According to some embodiments, the proposed solution provides an efficient way of storing which takes into account storage requirement and/or query speed to query the data.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "obtaining", "providing", "searching", "determining", "representing", "associating", "storing" or the like, refer to the action(s) and/or process(es) of a processor and memory circuitry (PMC) that manipulate and/or transform data into other data, said data represented as physical, such as electronic, quantities and/or said data representing the physical objects.

The term "processor and memory circuitry" (PMC) as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single processor or multiple processors, which may be located in the same geographical zone or may, at least partially, be located in different zones and may be able to communicate together.

The term "non-transitory memory" as used herein should be expansively construed to cover any volatile or non-volatile computer memory suitable to the presently disclosed subject matter.

Figure 1:
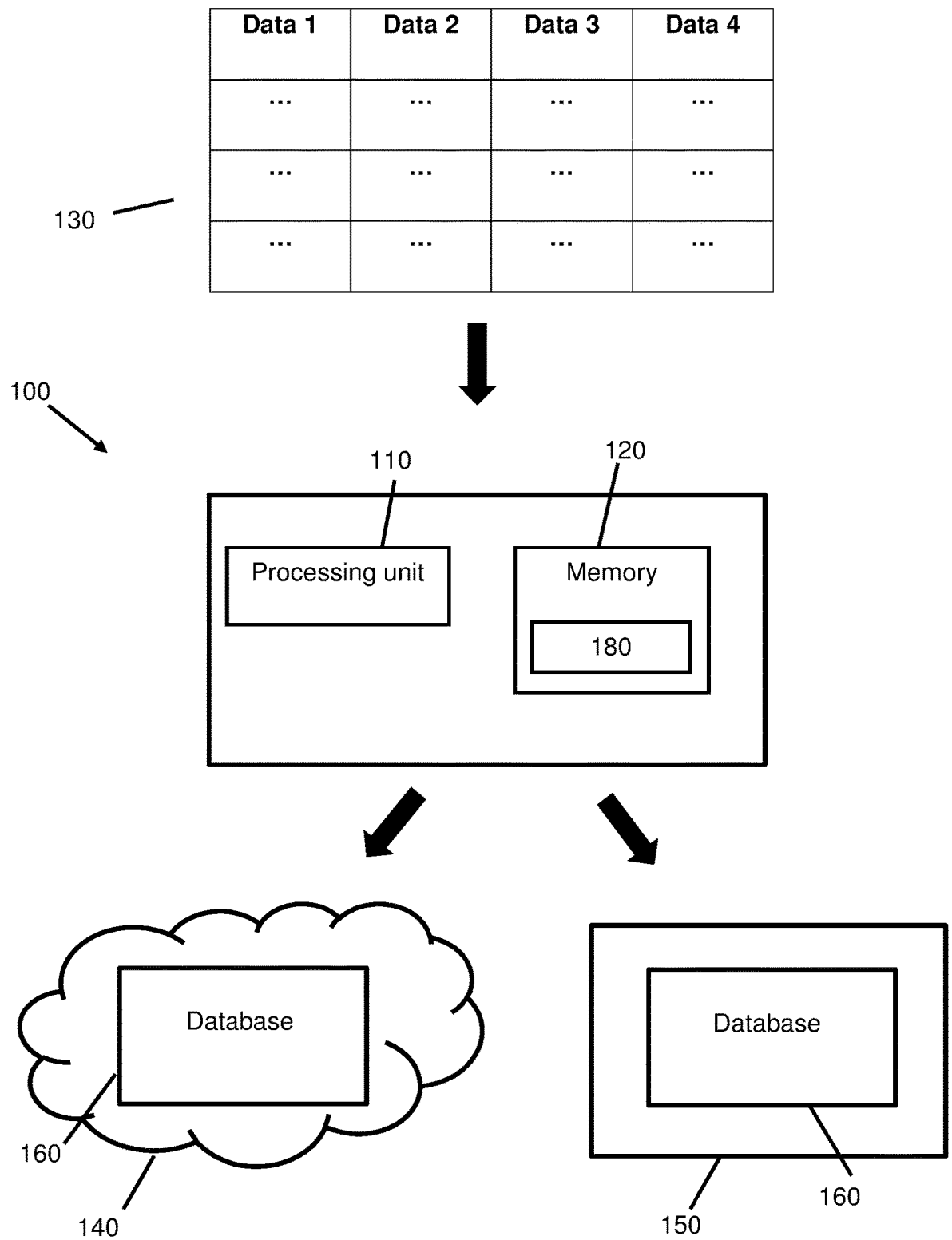
FIG. 1 illustrates an embodiment of a system which can be used to perform one or more of the methods described hereinafter.

FIG. 1 illustrates an embodiment of a system 100 which can be used to perform one or more of the methods described hereinafter. As shown, system 100 can comprise a processor and memory circuitry (see processing unit 110 and memory 120).

According to some embodiments, memory 120 can store a data structure 180 informative of a link between various data types. As explained in the various embodiments hereinafter, the data structure can be used e.g. for the purpose of storing data provided by the user in an existing database and/or in a new database, while complying with differences which can occur in data types.

A user (or a device) can provide, as an input to the system 100, a plurality of data 130. The plurality of data 130 can be divided into one or more groups of data.

In some embodiments, the plurality of data 130 comprises semi-structured data.

Each group of data can be identified for example because all data of this group share a common key or marker associated with this data.

In a non-limitative example, the plurality of data 130 comprises a table, and each group of data is a line or a column of the table. In the example of FIG. 1, the plurality of data 130 comprises four columns.

In some embodiments, the plurality of data 130 comprises structured data.

Generally, each group of data comprises data which share similarity, which is why this data is stored in the same group by the user. Examples of data similarity will be provided hereinafter.

As explained hereinafter, the plurality of data 130 is provided to the system 100 because it is desired e.g. to store the plurality of data 130 into one or more databases 160.

In some embodiments, a new database is created based on the plurality of data 130 provided by the user.

In other embodiments, a database already exists, and it is attempted to store the plurality of data 130 together with data of the existing database (e.g. in this existing database and/or in a new common database).

According to some embodiments, database 160 can be stored e.g. in a cloud 140. According to some embodiments, database 160 can be stored e.g. in a memory 150 (which can be e.g. a local memory or a remote memory accessible using known communication techniques, such as a network, wire/wireless communication, etc.). This is, however, not limitative.

Attention is now drawn to FIG. 2, which describes a method which can be used to store data in a database, in particular when difference of data types occurs within the data, as explained hereinafter.

Figure 3:
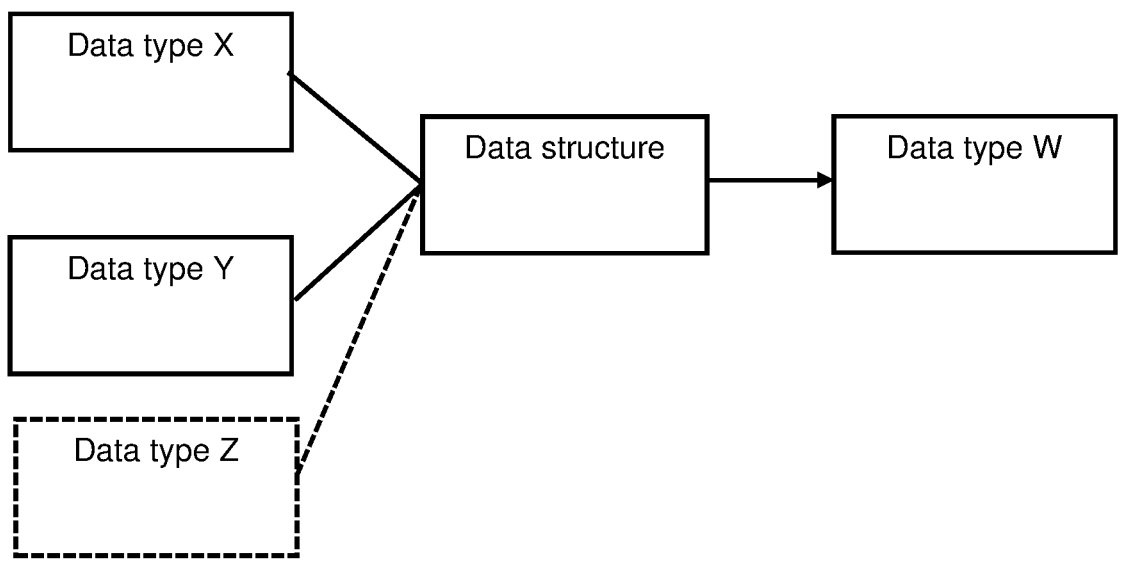
FIGS. 3, 4A, 4B and 4C are non-limitative examples of data structures usable to find a common data type.

The method can comprise obtaining (operation 210) a data structure informative of different data types. Non-limitative examples of this data structure are provided in FIGS. 3 and 4A. The data structure can be e.g. a hierarchical data structure informative of a link between the different data types.

The data structure can store a plurality of data types, or can be informative of the plurality of data types without necessarily storing them. A data type defines a type of data according to which data can be represented or encoded, in particular for the purpose of storing this data according to this data type.

Examples of data types include (this list is not limitative):
String;
Number (integer, float, Boolean, etc.);
Date;
Time;
Date and time;
Percentage;
Currency;
Etc.

According to some embodiments, each data type can be defined in a more accurate way (with one or more sub-categories—for example, sub-categories can define e.g. different values representative of maximal size or length for each data type).

Non-limitative examples of data types are provided hereinafter.

According to some embodiments, a number can be defined as an "integer".

In some embodiments, "integer" can be defined according to a maximal value that can be represented or encoded.

For example, data type "integer (X)" can represent any integer which value is equal to or less than "X".

According to some embodiments, a number can be defined as a "float".

Data type "float (Y)" can represent any float which value is equal to or less than "Y".

Each value of X or Y can therefore define a different data type in the data structure. If no value X or Y is defined, then "integer" or "float" are not limited to a predefined maximal value (up to a limit inherent to a storage capacity of the database, or up to a predefined storage maximal threshold of the database).

According to some embodiments, a "float" can be defined according to the number of decimal places.

For example, "float (Z)" defines a number which comprises at most Z decimal places (but there is no limitation on the integer part of the number, except a limit inherent to the storage capacity of the database or up to a predefined storage maximal threshold of the database).

Each value of Z can therefore define a different data type in the data structure.

According to some embodiments, a number can be represented as a "Boolean". The data type "Boolean" can comprise either value "1" or value "0". This option is represented in FIG. 4B.

According to some embodiments, a number can be defined as a "fraction".

Data type "fraction (1/X)" can define different numbers that can be encoded, wherein X can have different integer values (e.g. when X=2, data is encoded according to halves, etc.). Each value of X can therefore define a different data type in the data structure.

According to some embodiments, a number can be defined as a "percentage".

According to some embodiments, a percentage can be defined according to the number of decimal places. For example, "percentage (Z)" defines a Z decimal places percentage and not more. Each value of Z can therefore define a different data type in the data structure.

A string can be defined according to a number of characters (which can comprise e.g. either letters, numbers, or other characters). For example, "varchar(X)" (for variable characters) can encode a string which comprises, at most, X characters, but not more.

Each value of X can therefore define a different data type in the data structure.

If no value is defined for X, then "varchar" can correspond to a string of any size (up to a limit inherent to the storage capacity of the database or up to a predefined storage maximal threshold of the database).

According to some embodiments, a particular category of strings can be defined as a possible data type. For example, a data type can be defined as "Boolean" and comprises two possible values: "true" or "false". This option is represented in FIG. 4C.

According to some embodiments, data type "date" can be defined differently depending on the format of the date. Examples of format can comprise (this is not limitative):
Day/month/year, wherein day, month and year are numbers;
Day of the week/day in the month/month/year, wherein day in the month, month and year are numbers, and day of the week is a string;
Day/month/year, wherein day and year are numbers, and month is a string;
Etc.

According to some embodiments, data type "time" can be defined differently depending on the format of the time. Examples of format can comprise (this is not limitative):
Hour/minutes;
Hour/minutes/seconds;
Hour/minutes with parameter AM or PM;
Etc.

A combination of different data types can provide another data type. For example, data type "date and time" defines date and also time. It can combine one of the definitions provided above for date and one of the definitions provided above for time.

In other embodiments, the data type "date and time" can be defined using international standards, such as ISO-8601.

Examples of data types provided above are not limitative and other examples can be used.

The data structure can be stored in various ways. In some embodiments, the data structure is stored as a tree (e.g. "decision tree") comprising a plurality of nodes (see example of FIGS. 4A-4C).

In particular, each node is representative of a different data type. The decision tree can comprise various layers or levels. Each node $N_P$ (which is not an end node of the decision tree) is connected to at least one other node $N_C$ of the decision tree. $N_C$ is a children node of parent node $N_P$.

This connection means that any data which is of data type of a children node $N_C$ can be also represented by data type of a parent node $N_P$. In other words, a parent node $N_P$ represents a data type which is broader than data type of the children node $N_C$ (therefore data type of children node is included in data type of parent node).

For example, assume parent node $N_P$ represents a "float with two decimal places" and children node $N_C$ represents an "integer". Any integer can be also represented by a float with two decimal places equal to zero.

If a children node $N_1$ is connected to another parent node $N_3$ through at least one other node $N_2$ (in other words, $N_1$ is connected indirectly to $N_3$ and $N_2$ ensures junction between N1 and $N_3$), then both $N_2$ and $N_3$ correspond to data types which can also represent data type associated with node $N_1$.

FIG. 4B provides a particular non-limitative example of a decision tree.

As shown, a node is associated with data type "Boolean", which can have two values "1" or "0".

Node "Boolean" is connected to parent node "integer", which is a broader data type.

Node "integer" is itself connected to parent node "float". Indeed, any integer can be also represented by a float.

The node "float" is connected to parent node "varchar (25)". Indeed, most databases use a scientific notation to represent large numbers. According to IEEE-754 standard, the largest float is 1.7976931348623157e+308, therefore a string with at most 25 characters is sufficient to represent a float up to this number.

The decision tree further comprises a node "Date and time" (which corresponds to a data type representing both date and time). The actual representation which is used to represent date and time (see above various examples) can depend e.g. on parameters of the database itself which is used to store data.

As shown, node "date and time" is also connected to parent node "varchar(25)" (in FIGS. 4B and 4C, node "varchar(25)" is represented twice for the sake of the illustration, but in fact represents a unique node in the decision tree). Indeed, "varchar(25)" can represent most formats (or even all formats since any date-time format can be transformed to ISO 8601, which requires 25 characters) in which both date and time are stored (this is however not limitative). With microsecond resolution, the node would be "varchar (32)" accounting for the extra digits.

The decision tree comprises a plurality of nodes "varchar (X)", from X=0 (empty string) to X=N (largest supported string). In order to simplify representation of the decision tree, not all nodes "varchar(X)" are represented (for example, it is not represented that varchar(0) is connected to varchar(1), which is itself connected to varchar(2), etc.). In practice, each node "varchar(X)" can be connected to a parent node "varchar(X+1)", up to the root of the decision tree (which comprises node "varchar(N)"). It is however not mandatory to have a node for each integer from X=0 to X=N, and in a more simplified implementation, only some values from X=0 to X=N are associated with a node varchar (X).

It has to be noted that the representation of FIG. 4B is only an example and other representations can be used, with different nodes.

FIG. 4C illustrates a variant of the decision tree of FIG. 4B.

In the example of FIG. 4C, node "Boolean" can have two values: "true" or "false". It is connected to parent node "varchar(5)".

Indeed, any Boolean ("true" or "false") can be represented by a broader data type varchar(5) (which covers any string comprising at most 5 characters).

The representation of the data structure as a decision tree is not limitative. Other representations can be used, such as, a table, a graph, a list, a hashmap, etc. In some embodiments, the data structure can be stored as a piece of software which can be queried, and which returns an output based on the query.

Figure 2:
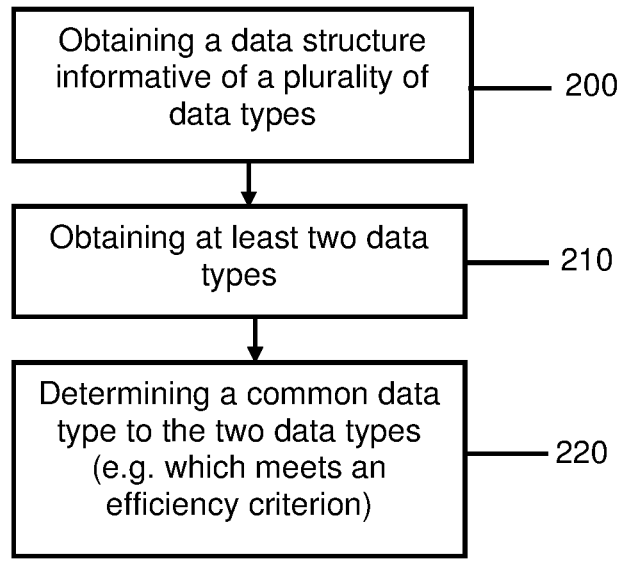
FIG. 2 illustrates an embodiment of a method which can be used to find a common data type.

As shown in operations 210 and 220 of FIG. 2, the data structure is particular since it is can be used (e.g. it can be searchable and/or can be queried, etc.) in order to provide, based on an input of at least two (or more) data types (for example "data type 1" and "data type 2"), a data type which is adapted to represent both data of "data type 1" and of "data type 2" (or more depending on the input).

In other words, the data type which is output based on the data structure is a broader data type which includes both "data type 1" and "data type 2".

For example, assume a first data type is "Boolean" (which can have value "true" or "false") and another data type is "varchar(3)" (which corresponds to any string that comprises at most three characters), then a common data type can be output as "varchar(5)" (which corresponds to any string that comprises at most five characters).

Figure 4A:
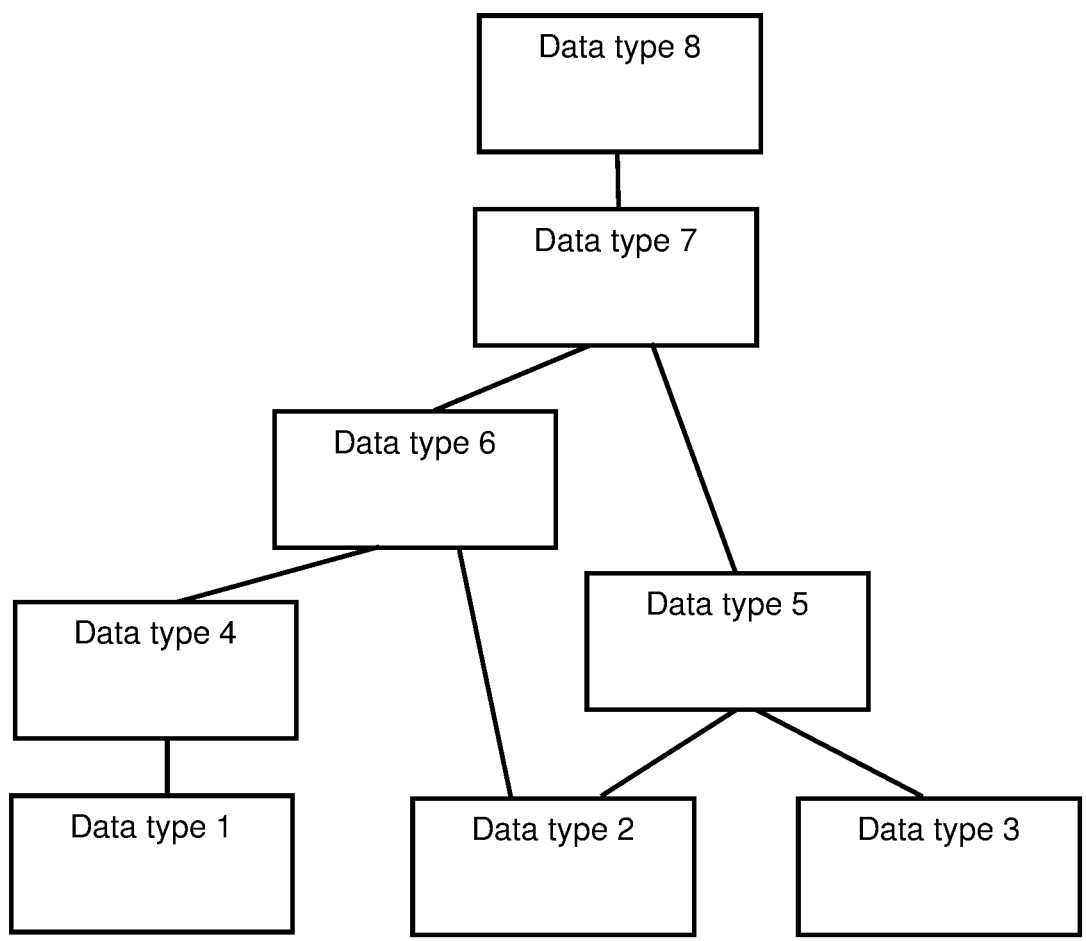
Figure 4B:
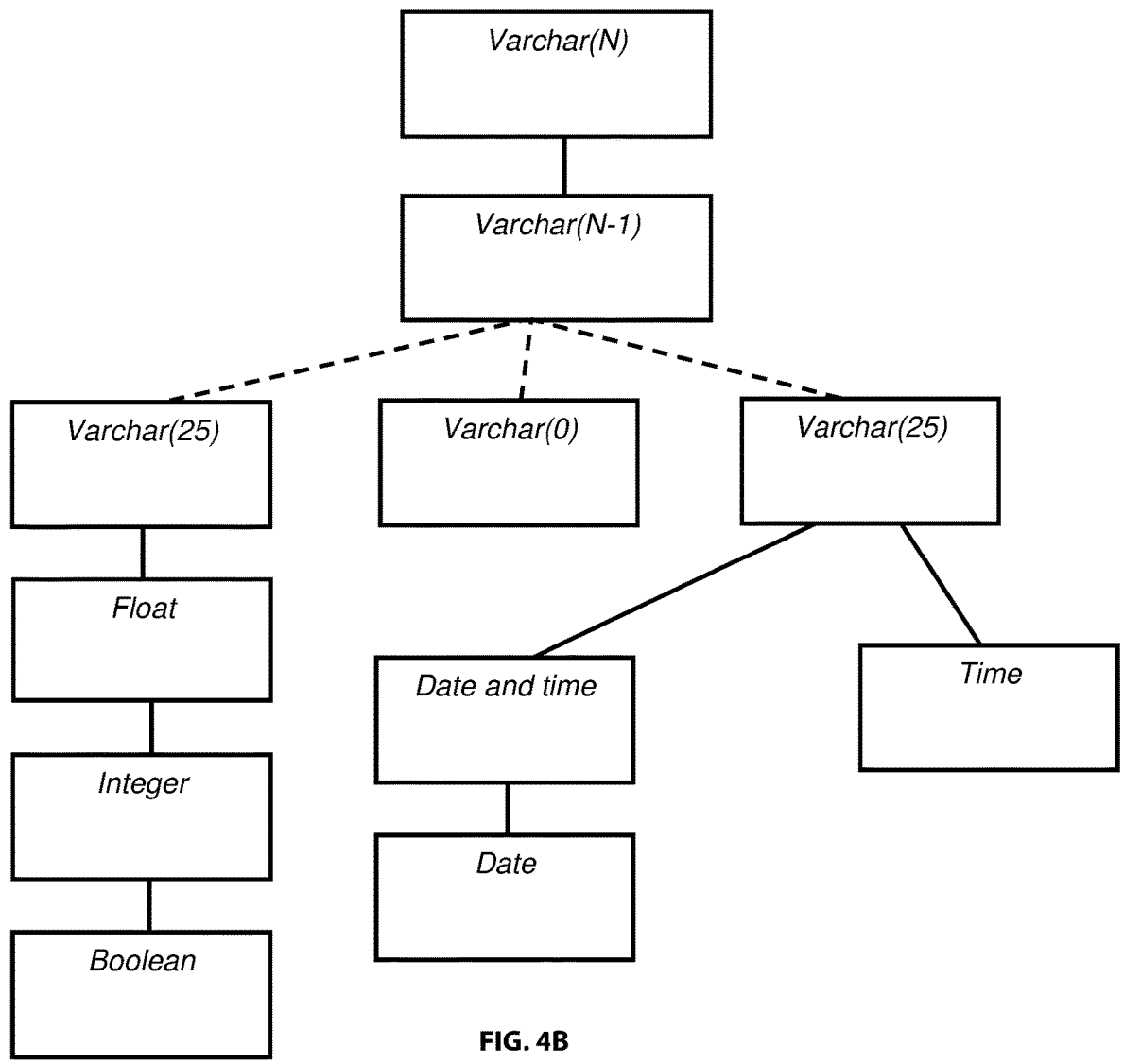
Figure 4C:
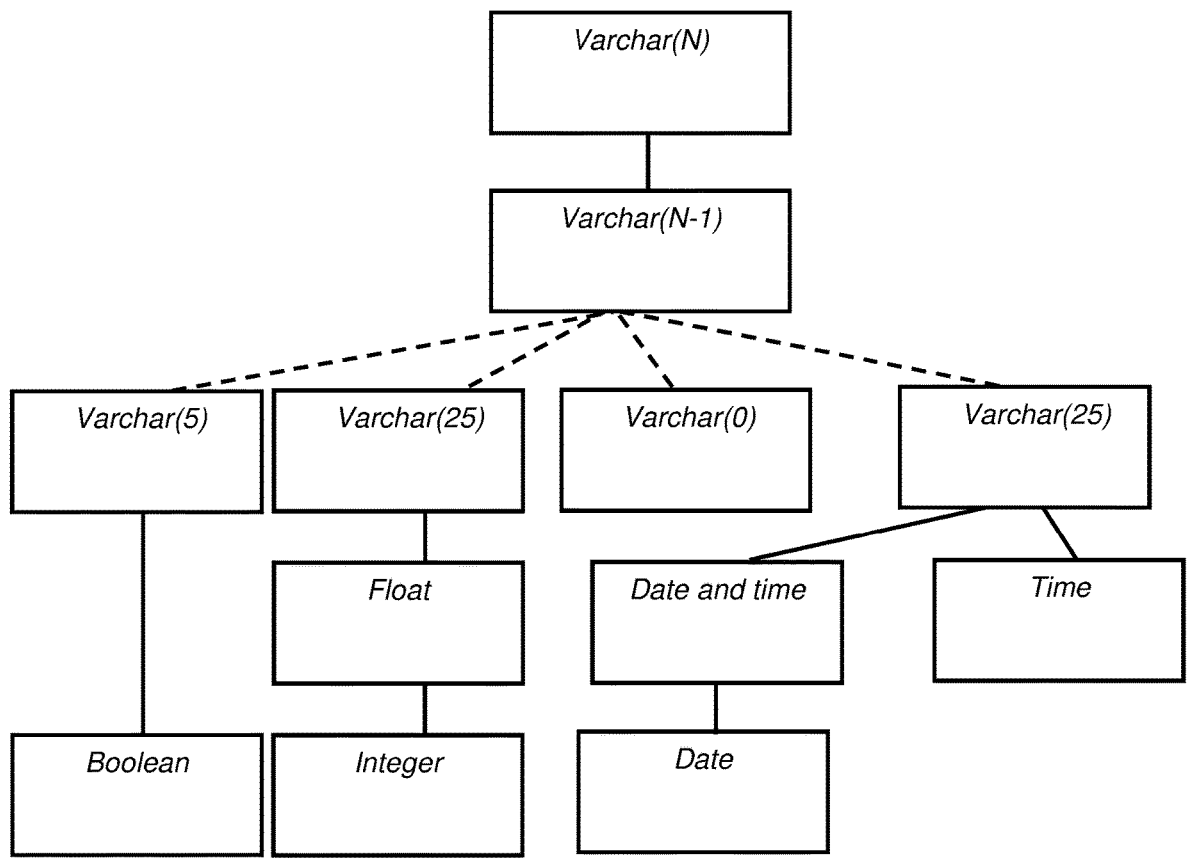

In the representation of FIG. 4A, the decision tree can be used so as to determine a common data type of two or more data types. For example, a common data type of "data type 2" and "data type 3" is "data type 5" in the decision tree, since "data type 5" is a parent node of both "data type 2" and "data type 3".

According to some embodiments, the data structure is usable so as to determine, for at least a first data type and a second data type among the plurality of data types, a given data type which is adapted to represent both data of at least the first data type and the second data type for their storage according to an efficiency criterion. According to some embodiments, and as explained hereinafter, since the data structure can be used iteratively, a common data type can be determined for a number of different data types which is larger than two.

According to some embodiments, the efficiency criterion can ensure an optimization (which is not necessarily the most optimized one) of the storage which is required to store both data belonging to the first data type and data belonging to the second data type according to a common data type.

Assume the decision tree of FIG. 4A is used to find a given data type which is adapted to represent both data of "data type 1" and data of "data type 2". A plurality of data types meets this requirement: "data type 6", "data type 7" and "data type 8".

Since each parent node in the decision tree represents a broader data type of its children nodes, storage (size of memory) required to store any data according to the representation of the corresponding broader data type is higher than storage required to store this data according to the representation of the data type of a children node.

This can be understood e.g. on a simple example. Assume "data type 6" is varchar(8) (any string which comprises at most eight characters), "data type 7" is varchar(9) (any string which comprises at most nine characters) and "data type 8" is varchar(10) (any string which comprises at most ten characters).

Any string which has a length which is equal to or less than eight characters can be represented either by varchar(8), varchar(9) or varchar(10).

However, for all strings which have a length that is equal to or less than eight characters, varchar(10) will require more storage than varchar(9), and varchar(9) will require more storage than varchar(8).

This is because the representation of varchar(10) will systematically comprise e.g. ten bits (if each character is coded using only one bit, this is however not limitative), wherein for all strings of eight characters two of these bits will be useless and will systematically comprise a zero.

The same applies to varchar(9) which will always comprise an additional bit which is useless. In other words, varchar(9) and varchar(10) are too broad data types for representing strings of eight characters, and therefore are not the most optimized for data storage in this example.

Although an example has been provided which pertains to strings, this applies similarly to other data types (see other non-limitative examples of data types above).

According to some embodiments, the efficiency criterion is met for a given data type when the given data type requires the lowest storage for representing data of at least the first data type and the second data type among all data types of the data structure.

This is however not limitative and, in some embodiments, it can be defined that the given data type is not necessarily the data type which requires the lowest storage among all data types of the data structure, but one of the lowest (e.g. the second, or third—this is not limitative).

According to some embodiments, the efficiency criterion can take into account other parameters, such as query speed for querying the data stored using the common data type in the database. This can be illustrated on a simple example.

Assume that first data includes a string with 1000 chars, all with the value of 'A': "AAAAAA..." (1000 times), and second data includes a string with 1000 chars, all with the string 'B': "BBBBBB..." (1000 times).

If only storage size is considered, a common data type can be varchar(6), since the first data can be represented as "Ax1000" and the second data can be represented as "Bx1000". However, if the first data and the second data are stored using varchar(6), when the user queries his data and transmits a request "val>='B'", it will be required to decompress the stored value "Ax1000" back to its original form ("AAAAAA..." repeated 1000 times) and then determine whether it is larger than "B" (answer is FALSE). Then, it will be required to decompress the stored value "Bx1000" back to its original form ("BBBBBB..." repeated 1000 times) and determine whether it is larger than "B" (answer is TRUE).

To the contrary, if the first data ("AAAAAA..." repeated 1000 times) and the second data are each stored using the common data type "varchar(1000)", when the user transmits the request "val>='B'", the answer can be immediately found without requiring decompressing each stored value. The query speed is therefore optimized, although the storage size is less optimal. This example is however not limitative.

The data structure can therefore store and/or output for each pair of data types of the structure (or more generally for each group of data types) a common data type which is both adapted to represent the pair of data types. In some embodiments, the common data type is selected to meet the efficiency criterion, as mentioned above.

In particular, the data structure can store (in some hierarchical fashion):
  information indicating which data types can represent other data types of the data structure; and
  information indicating which data types require more storage than the others.

If the data structure is a decision tree, the data type which is adapted to represent both "data type 1" and "data type 2" and which meets the efficiency criterion can be found e.g. by searching for the first parent node in the decision tree which is connected to both node of data type 1 and node of data type 2 (because the tree was built so that the first parent node connected to both node of data type 1 and data type 2 is the most optimized with respect to the efficiency criterion). This is however not limitative.

In some examples, if the query pertains to "data type 1" and "data type 4" (see FIG. 4A), since node of "data type 4" is itself a parent node of "data type 1", therefore the common data type which meets the efficiency criterion is "data type 4", and there is no need to search for a higher level parent node (since "data type 4" covers itself both "data type 1" and "data type 4" and meets the efficiency criterion).

For example, in FIG. 4B, node "Boolean" is connected to node "varchar(5)", therefore if the decision tree is searched to find a data type which is common to "Boolean" and "varchar(5)", and which meets the efficiency criterion, then the decision tree will output "varchar(5)".

In some embodiments, the data structure is a tree which can be searched only in one "direction". This means that that for any query in which a common data type has to be found for a first data type and a second data type, the decision tree will search only among:
  parent nodes of the node associated with the first data type and of the node associated with the second data type, and
  if the first data type is a parent node of the second data type (or conversely), among the first data type (or the second data type).

In some embodiments, and as explained hereinafter, the data structure is used several times in a process in which several data of different data types are aggregated into a common database.

In some embodiments, in this process, each time the data structure is searched (or queried), the current position in the data structure can be stored, and when the data structure is subsequently searched (or queried), it will allow only a search (or a query):
  in the direction of the decision tree in which parent nodes of the current position are located, or
  in the current position, in case the current position is a parent node of all other nodes of the query.

This ensures that the data type which is output will comply with all data types that have been searched/queried until the current search/query, since the decision tree always outputs a data type which is the same or broader than the previous data type.

Specific examples will be provided hereinafter.

Figure 5:
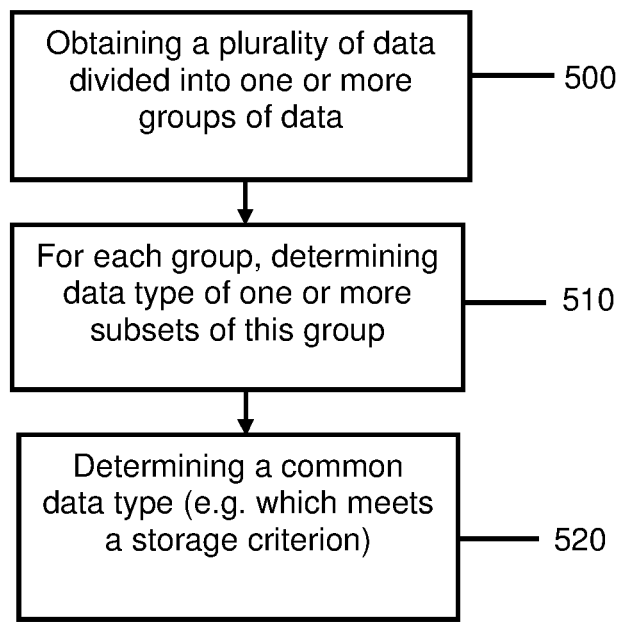
FIG. 5 illustrates an embodiment of a method of determining a common data type for each group (e.g. columns) of a plurality of data.

Attention is now drawn to FIG. 5, which describes an embodiment of a method of processing and handling data that has to be stored in a database.

As shown, the method comprises obtaining (operation 500) a plurality of data. The plurality of data can be provided to the system 100 by a user using any adapted means, such as a network, a storage device, another computer, a wire communication, a wireless communication, etc.

As explained above, the plurality of data is divided into one or more groups of data (for example, each group is a different column, or is associated with a different label which can be identified). Pointers or labels or any adapted representation can indicate to which group each data belongs.

In some embodiments, only one group of data is present and therefore all data is stored into one unique group.

Assume at least one group of data $G_1$ of plurality of data can be divided into one or more subsets $S_1$ to $S_N$ (e.g. by a processor and memory circuitry). For example, if the plurality of data comprises a table, and $G_1$ is a column, then each subset $S_i$ can comprise one or more lines which belong to column $G_1$. If a single subset is present, then the group is processed as a whole.

Figure 6A:
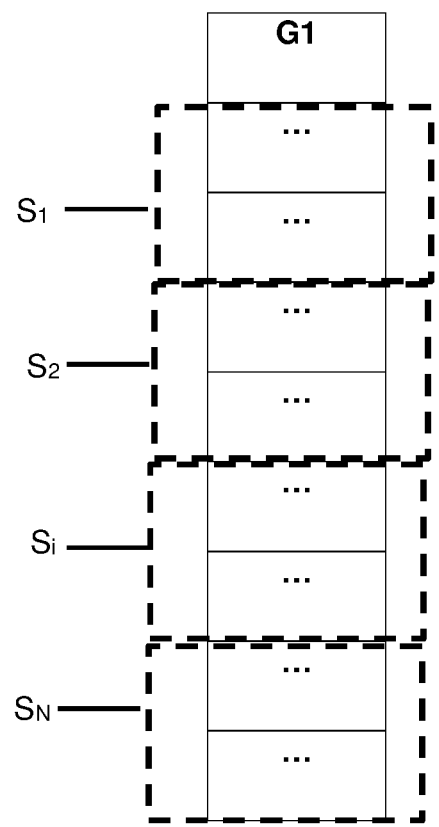
FIGS. 6A and 6B illustrate examples of division of one or more groups of data of a plurality of data into one or more subsets of data.

A non-limitative example is provided in FIG. 6A in which each subset comprises two lines of column $G_1$. This is however not limitative.

Figure 6B:
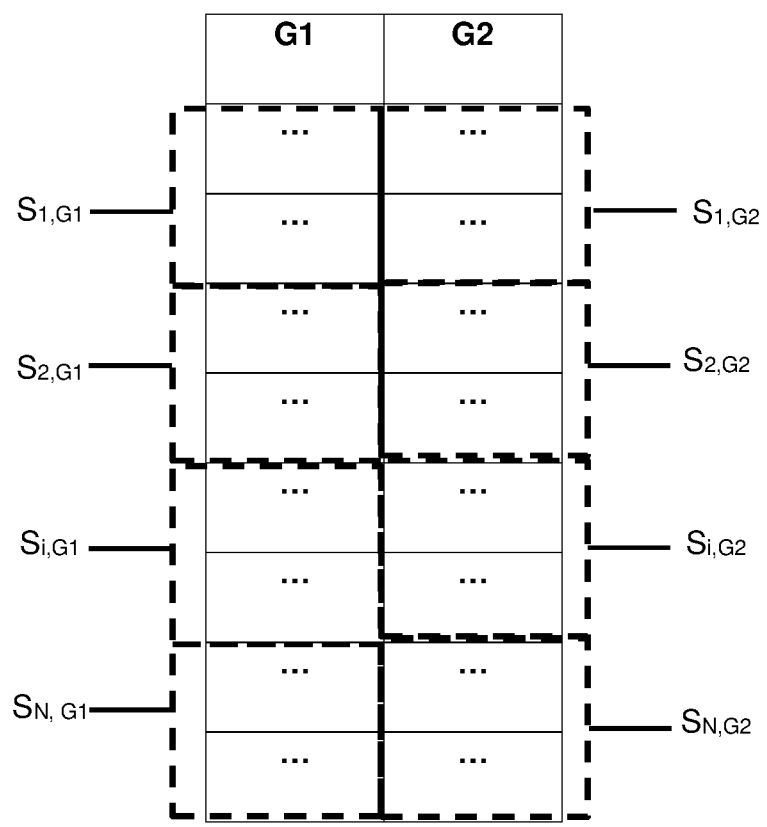

Another non-limitative example is provided in FIG. 6B, in which the data structure comprises two groups, and each group $G_1$, $G_2$ is divided into a plurality of subsets each comprising two lines of data. This is however not limitative.

The subsets of a given group of data are not necessarily of the same size. In addition, the subsets of data are necessarily of the same size between two different groups of data. In some embodiments, predefined rules indicate how to divide a given group of data into one or more subsets (e.g. the rules indicate the size of each subset). In some embodiments, the data type of the data is already known (e.g. provided by the user) and each subset can be selected to include data of the same data type.

The method can comprise, for each subset $S_i$, determining (operation 510) a data type which is adapted to represent data belonging to this subset of data $S_i$.

Therefore, for each subset of data $S_i$, a data type $DT_{Si}$ is obtained. Embodiments for determining data type of a subset of data comprising a plurality of data will be described hereinafter (see FIG. 6C and FIG. 6D).

According to some embodiments, the data type of each data is already available when each group of data is obtained. For example, the user can specify the data type of each data. A label (e.g. reflecting the data type indicated by the user) can be associated with each data, which stores the data type.

According to some embodiments, the method can include determining the data type. Determination of data type of a given piece of data can involve using a computer-implemented function (software) which receives, as an input, data and can analyse characters stored in the data in order to output a data type of the data (among the predefined number of data types which are stored in the data structure).

The function can attempt to find the data type which meets an efficiency criterion among all possible data types of the data structure. The efficiency criterion can define that the selected data type ensures a low memory storage size of the data (e.g. the lowest memory storage size) and/or that query speed is minimized, as mentioned above.

For example, if the data is "false", data type "Boolean" ensures a lower memory storage than "varchar(5)".

For example, the function can perform the following operations:
  extracting characters of the data;
  comparing with predefined patterns of data; and
  identifying data type of data.

Assume for example that the data comprises "Wednesday March 10". Assume that multiple predefined patterns for day/time are stored. The piece of data can be compared to these patterns, and it can be identified that the data corresponds to a date. This piece of data can be converted into another format (e.g. Jason format), which better fits to the storage in a database.

In some embodiments, the function can perform the following operations:
  extracting characters of the data;
  analysing whether characters are strings and/or numbers;
  if the characters are only numbers, identifying the correct data type (integer, float, etc.) with the correct size (size of the integer, or number of decimal places, etc.), and outputting the relevant data type among all pre-stored data types;
  if the characters comprise numbers and additional characters which are not letters, identifying the correct data type accordingly. For example, if the additional characters comprise sign "%", identifying data type "percentage"; if the additional characters comprise a sign representative of currency, such as "$", identifying data type "currency"; if the additional characters comprise at least two times character "/" between two numbers, identifying data type "date", etc.;
  if the characters comprise only letters, identifying a data type such as "Boolean" or "varchar" (with a length of the string); and
  if the characters comprise numbers and letters, attempting to identify a data type such as "date", "date and time", or, if this is not adequate, "varchar".

Operations described above are not limitative and other operations can be performed depending on the data types that are to be identified.

The method can comprise, based on the data types $DT_{Si}$ that have been identified, and on the plurality of data, an operation 520 which comprises determining a common data type $DT_{com}$ which is adapted to represent all data belonging to subsets of data $S_1$ to $S_N$ of a group of data.

If a plurality of groups of data are present in the data structure, a common data type can be output which is specific to each group of data.

As explained hereinafter, this common data type can be used to store all data of the group of data in a database, wherein all data are represented/encoded using this common data type.

In particular, the common data type can be a data type which:
  is adapted to represent all data of a given group of data, and
  enables storage of the data of the given group of data according to an efficiency criterion (as mentioned above, this can include the fact that the common data type requires the lowest storage size (or, in some embodiments, one of the lowest) among all possible data types stored in the data structure, for storing data of the given group of data, and/or enables to optimize query speed of the data stored according to the common data type in a database).

It has been mentioned above that operation 510 comprises determining data type $DT_{Si}$ of a subset $S_i$. Embodiments for determining data type which is adapted to a whole subset $S_i$ are provided below.

Assume subset $S_i$ comprises "Data j" with j from 1 to p.

If subset $S_i$ comprises only one data (p=1), then data type $DT_{Si}$ can be determined using the function mentioned above, which detects data type of "data 1" stored in the subset $S_i$. Since a single piece of data is present, $DT_{Si}$ is determined and is adapted for the whole subset $S_i$.

Figure 6C:
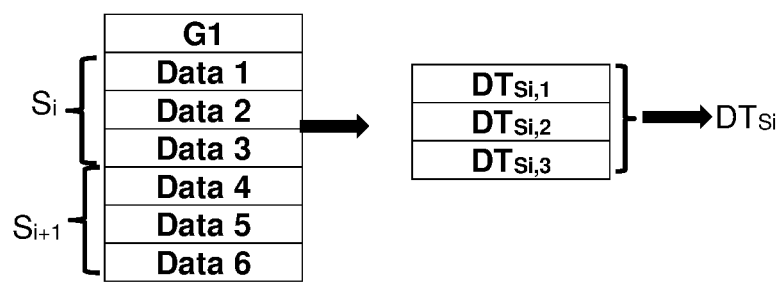
FIGS. 6C and 6D illustrate examples for determining data type of a subset of data comprising a plurality of data.

If subset $S_i$ comprises a plurality of data (that is to say that p>1—for example, subset $S_i$ corresponds to a plurality of lines of a given column), then data type $DT_{Si}$ of subset $S_i$ has to be determined such that it is adapted for all data of this subset $S_i$. An example is shown in FIG. 6C.

Assume data type $DT_{Si,j}$ is determined for each "Data j" of subset $S_i$ (with j from 1 to p), using the function mentioned above.

According to some embodiments, operation 510 can include using all data types $DT_{Si,j}$ (with j from 1 to p) determined for data of subset $S_i$ to search (or query) the data structure. A common data type $DT_{Si}$ is output, which is adapted for this subset $S_i$. In some embodiments, the common data type $DT_{Si}$ meets an efficiency criterion, that is to say that it requires the lowest storage (or one of the lowest storage requirement) among all possible data types stored in the data structure, for storing data of the subset $S_i$, and/or enables to optimize query speed for data of subset $S_i$ stored using the common data type $DT_{Si}$.

According to some other embodiments, common data type $DT_{Si}$ of subset $S_i$ can be determined by progressively scanning data of subset $S_i$.

This can comprise, for j from 1 to p:
for j=1, $DT_{Si}=DT_{Si,1}$;
for j>1, comparing $DT_{Si,j}$ with $DT_{Si}$:
    if $DT_{Si,j}$ is equal to $DT_{Si}$, then incrementing j by one;
    if $DT_{Si,j}$ is different from $DT_{Si}$:
        using the data structure to determine a common data type to $DT_{Si,j}$ and $DT_{Si}$ (e.g. which meets the storage criterion), and
        assigning $DT_{Si}$ equal to this common data type and incrementing j by one.

Figure 6D:
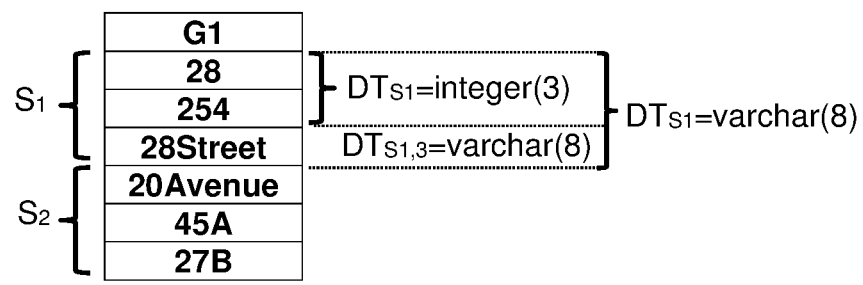

A non-limitative example of this second method is provided in FIG. 6D.

A user stores in a table data representative of an address, which can comprise numbers, numbers with characters, or numbers with expression such as "Street" or "Avenue" (signification of the data does not need to be known by the system and is provided for illustration only).

A first subset $S_1$ comprises three data: "28", 254" and "28Street".

A common data type of "28" and "254" is "integer(3)" (meaning integer with at most three digits). Therefore, at this stage, $DT_{S1}$ is temporarily equal to integer(3).

This data type $DT_{S1}$ is compared to data type of "28Street" which is "varchar(8)" (meaning a string with at most eight characters). Since the two data types are different, a new common data type $DT_{S1}$ is determined using the data structure, which corresponds to $DT_{S1}$="varchar(8)" for subset $S_1$.

Figure 6E:
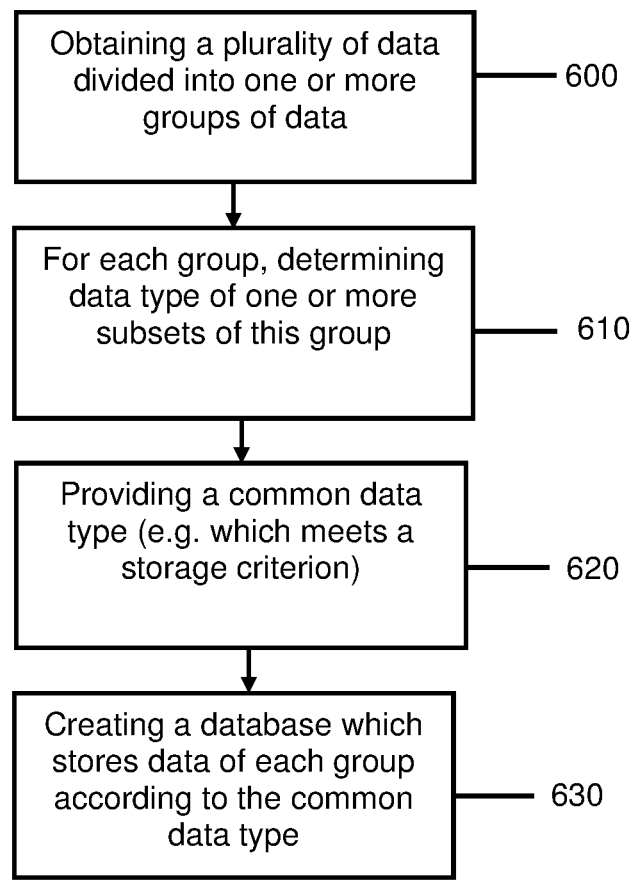
FIG. 6E describes a possible application of the method of FIG. 5, for creating a database.

Attention is now drawn to FIG. 6E, which describes a possible application of the method of FIG. 5, for creating a database.

The method comprises obtaining a plurality of data (operation 600, similar to operation 500 above), determining data type of one or more subsets of each group of data of the plurality of data (operation 610, similar to operation 510 above) and determining a common data type for each group based on the data structure (operation 620, similar to operation 520 above).

Assume the plurality of data has to be stored in a database to be created. The method can comprise creating a database comprising the same number of groups ($G'_1$ to $G'_M$) as the plurality of data ($G_1$ to $G_M$). Each group $G'_i$ of the database is assigned the common data type $DT_{Gi}$ that was identified for group $G_i$ of the plurality of data. Each data of group $G_i$ is represented and stored in corresponding group $G'_i$ according to the common data type $DT_{Gi}$ (operation 630).

Figure 6F:
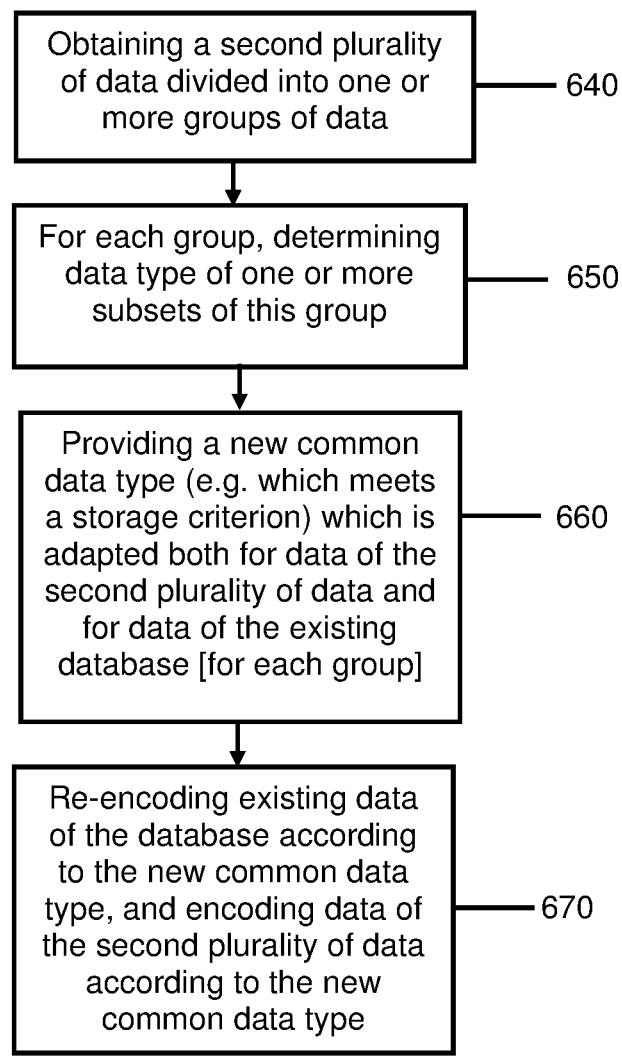
FIG. 6F describes a possible application of the method of FIG. 5, for updating an existing database.
Figure 6G:
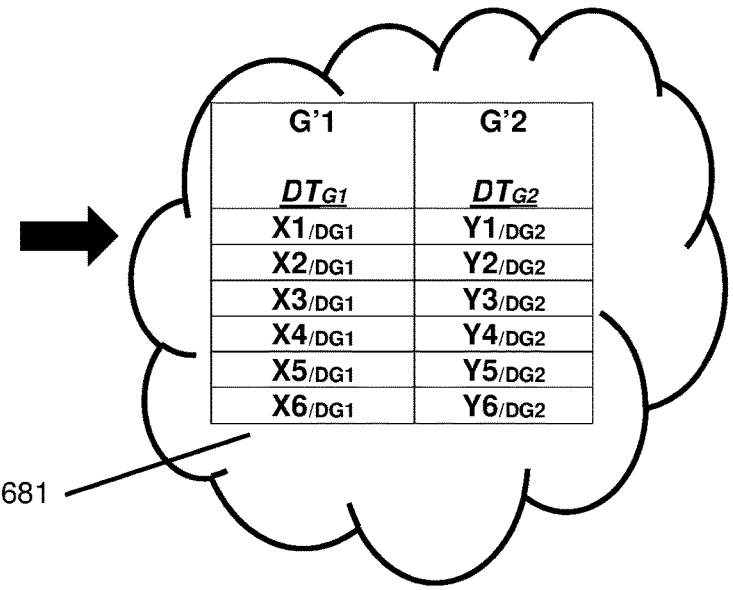
FIG. 6G describes a non-limitative example of the methods of FIGS. 6E and 6F.
Figure 6G:
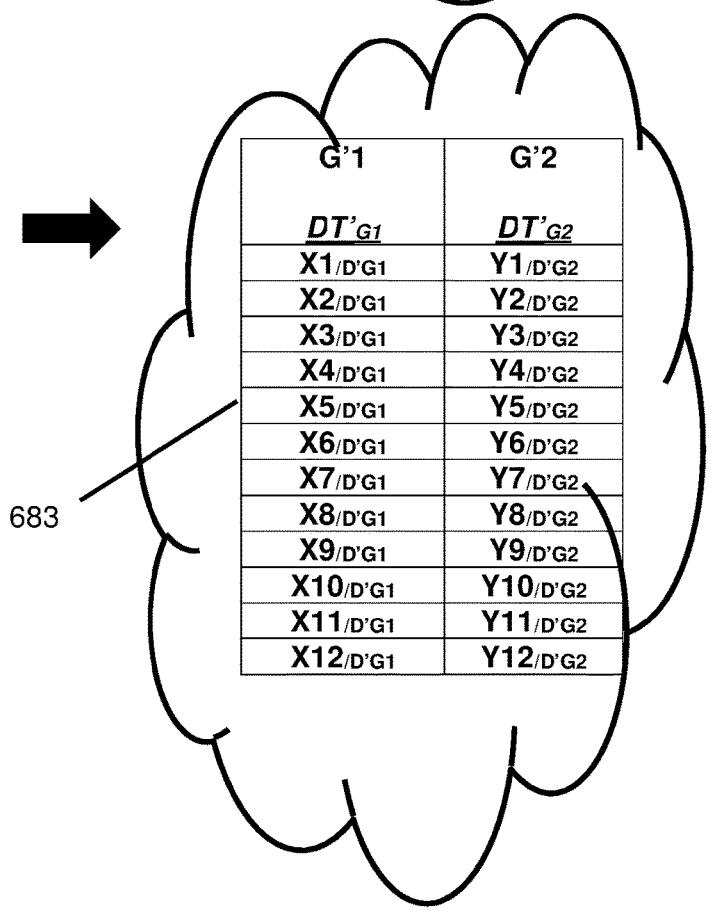

A non-limitative example is provided in the upper part of FIG. 6G, in which a plurality of data 680 comprising two groups $G_1$, $G_2$ is provided. Common data type for $G_1$ has been identified as $DT_{G1}$, and common data type for $G_2$ has been identified as $DT_{G2}$. This yields to the creation of a new database 681 comprising two groups $G'_1$ and $G'_2$ in which data of the data structure 680 is respectively stored according to data type $DT_{G1}$ and data type $DT_{G2}$.

Attention is now drawn to FIG. 6F, which describes a possible application of the method of FIG. 5, for updating an existing database.

Assume that a second plurality of data (see e.g. reference 682 in the bottom part of FIG. 6G) is provided to the system 100 and has to be stored together with data of the database 681 into a common database.

This second plurality of data 682 comprises also data divided into a plurality of groups $G_i$. This can be identified by determining labels associated with the data and/or columns or lines of the plurality of data. It is assumed for example that the first column (or row) of the second plurality of data 682 corresponds to the same group as the first column (or row) of the database. This applies also the other columns (or rows).

Once the second plurality of data 682 has been obtained by the system (operation 640), a method can comprise determining data type of one or more subsets of each group of data of the second plurality of data 682 (operation 650, similar to operation 510 above).

It is desired to store data of each group $G_i$ of the second plurality of data 682 with data already stored in the corresponding group $G'_i$ into a common database (e.g. by updating the existing database 681).

Therefore, the method can comprise determining (operation 660), for each group $G_i$ of the second plurality of data 682, a new common data type $DT'_{Gi}$ which is adapted both for data of the second plurality of data 682 and for data type $DT_{Gi}$ of the existing database 681. In some examples, the new common data type $DT'_{Gi}$ remains equal to $DT_{Gi}$ since data of the second plurality of data 682 is compliant with the "old" common data type $DT_{Gi}$.

The method can comprise, for each group $G_i$ of the second plurality of data 682, encoding data according to the new common data type $DT'_{Gi}$ for their storage (operation 670).

If a new common data type $DT'G_i$ different from $DT_{Gi}$ is obtained, then the method can comprise (operation 670), for each group $G'_i$ of the database 681, re-encoding existing data of the database 681 according to the new common data type $DT'_{Gi}$.

In some embodiments, this can comprise changing in the existing database 681 the data type associated to each group $G_i$.

In other embodiments (e.g. for a database which does not allow changing data type of the existing groups), the method can comprise duplicating data of the existing database 681 and creating a new database with the new common data type assigned to each group of the new database. The new database will store both data of database 681 and data of the second plurality of data 682 according to the new common data type $DT'_{Gi}$.

All this data is then stored by group into a common database (see reference 683), in which each group is assigned with the new common data type $DT'_{Gi}$.

These operations can be repeated each time new data has to be inserted in the database.

If the second plurality of data 682 comprises more groups than the existing database, then the additional group of the second plurality of data 682 will cause creation of a new group in the database.

Creation of a new group can be performed similarly to any method described in the present application in which a new database is created (the difference is that instead of creating a new database, a new group is created in addition to existing group(s) of the database).

For example, the method of FIG. 6E which was described for the creation of a database can be applied to create, in a similar way, a new group in an existing database.

If the second plurality of data comprises less groups than the existing database, then only the groups which are common to the second plurality of data and to the existing database will be handled e.g. according to the method of FIG. 6F.

Figure 7A:
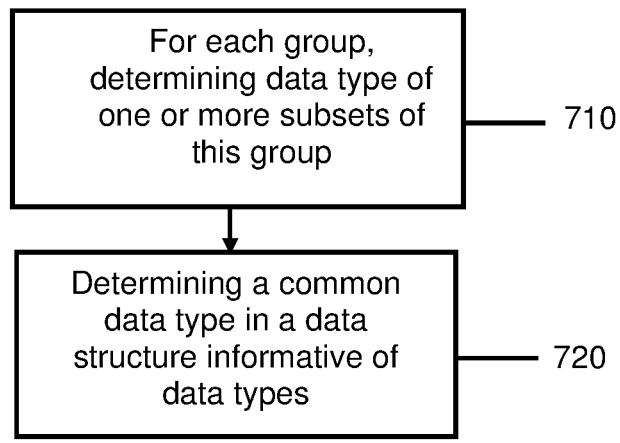
FIG. 7A represents a possible implementation of operation 520 performed in the method of FIG. 5.

Attention is drawn to FIG. 7A, which represents a possible implementation of operation 520 performed in the method of FIG. 5.

Assume a data type $DT_{Si}$ has been obtained for each subset of data $S_i$ (with i from 1 to N, as explained above in operation 510) of a group of data (operation 710).

The method can comprise (operation 720) using the data structure in order to find a common data type for all these subsets, and therefore for the whole group.

For example, if the data structure is a decision tree, then each data type $DT_{Si}$ corresponds to a node in the decision tree (a plurality of nodes is thus identified, one for each data type $DT_{Si}$). The common data type can be identified in the decision tree as a parent node which is connected (directly or indirectly) to all of this plurality of nodes.

The efficiency criterion can be used to select the parent node which optimizes storage and/or query speed among all parent nodes which are representative of a common data type to all data types $D_{S1}$ to $D_{SN}$.

For example, assume a first data type of subset $S_1$ is "float", a second data type of subset $S_2$ is "varchar(10)" (string comprising at most ten characters) and a third data type of subset $S_3$ is "date and time". The common data type can be identified as varchar(25) (string comprising at most twenty five characters) which is adapted to represent these three data types, and is also optimized in terms of storage requirement.

If the plurality of data comprises a plurality of groups of data $G_1$ to $G_M$ (e.g. a plurality of columns), the method can comprise performing operations 710 and 720 for each group of data $G_i$, in order to find a common data type $DT_{Gi}$ specific to each group of data $G_i$.

Figure 7B:
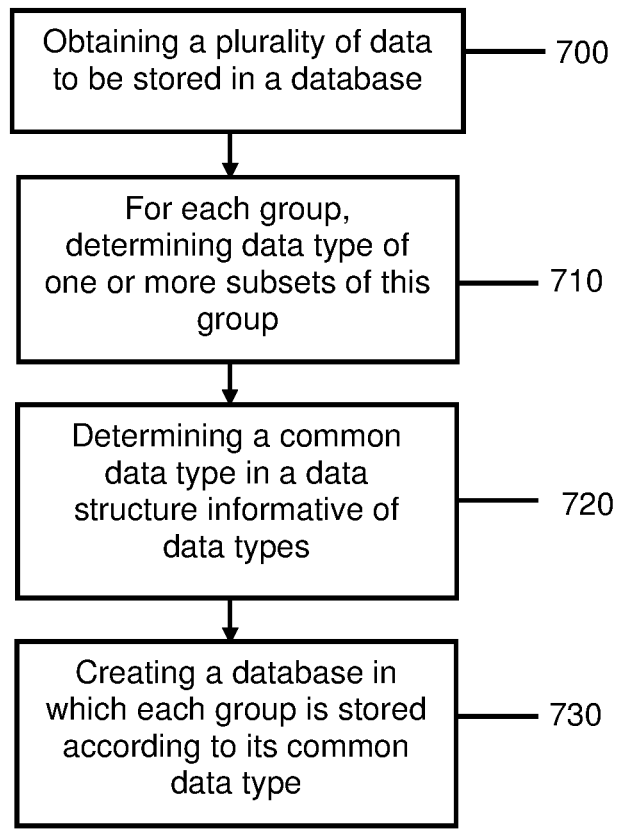
FIG. 7B describes a possible method of storing data in a database using the method of FIG. 7A.

Attention is drawn to FIG. 7B, which describes a possible method of storing data in a database using the method of FIG. 7A.

Assume a plurality of data is provided to the system 100 e.g. by a user, in order to be stored in database (for example the database can be stored remotely on a cloud 140, this is however not limitative). The plurality of data comprises one or more groups of data $G_1$ to $G_M$.

The method can comprise performing operations 710 and 720 (see FIG. 7A) on this plurality of data.

Since a common data type $DT_{Gi}$ has been identified for each group of data $G_i$, the method can comprise creating a database comprising the same number of groups of data $G'_i$ (e.g. columns), with i from 1 to M, wherein each group of data $G'_i$ is assigned with the common data type $DT_{Gi}$ that has been identified at operation 720. This assignment represents the fact that any data that is stored in group $G'_i$ of the database will be encoded according to the common data type $DT_{Gi}$ (as mentioned in the embodiments hereinafter, this common data type can evolve over time).

The method can comprise encoding data of group $G_i$ according to the common data type $DT_{Gi}$, and storing the encoded data in group $G'_i$ of the database (operation 730).

Figure 7C:
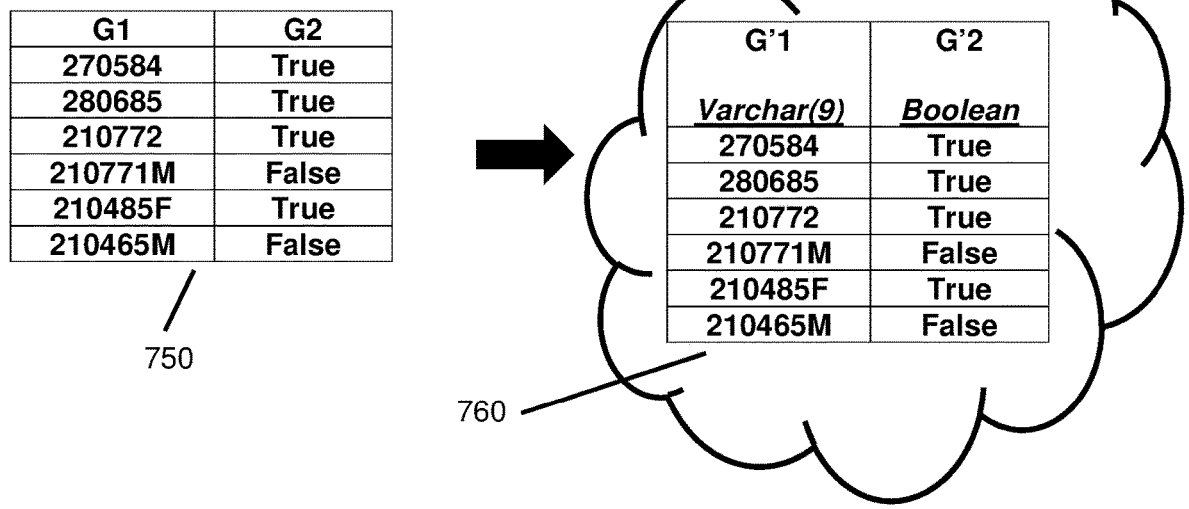
FIG. 7C describes a non-limitative example of the method of FIG. 7B.

A non-limitative example is provided in FIG. 7C.

A plurality of data 750 is provided by a user (e.g. a government). The plurality of data comprises two groups of data $G_1$ and $G_2$.

In the first group of data $G_1$, identity number of people is stored. After a period of time, the user has decided to add a new character in the data which can comprise either "M" (for male) and "F" (for female).

In the second group of data $G_2$, the user stores data which represents whether each person is a citizen of the country ("true" corresponds to "citizen of the country" and "false" corresponds to "non-citizen").

Using the method of FIG. 7B, the system recognizes that a common data type (which meets the efficiency criterion) for the first group $G_1$ is a string of at most nine characters. Therefore, it creates a database 760 with a first group $G'_1$ in which data is stored according to data type "varchar(9)".

Using the method of FIG. 7B, the system recognizes that a common data type (which meets the efficiency criterion) for the second group $G_2$ is "Boolean" (this datatype comprises either true or false). Therefore, it creates in the database 760 a second group $G'_2$ in which data is stored according to data type "Boolean".

Figure 7D:
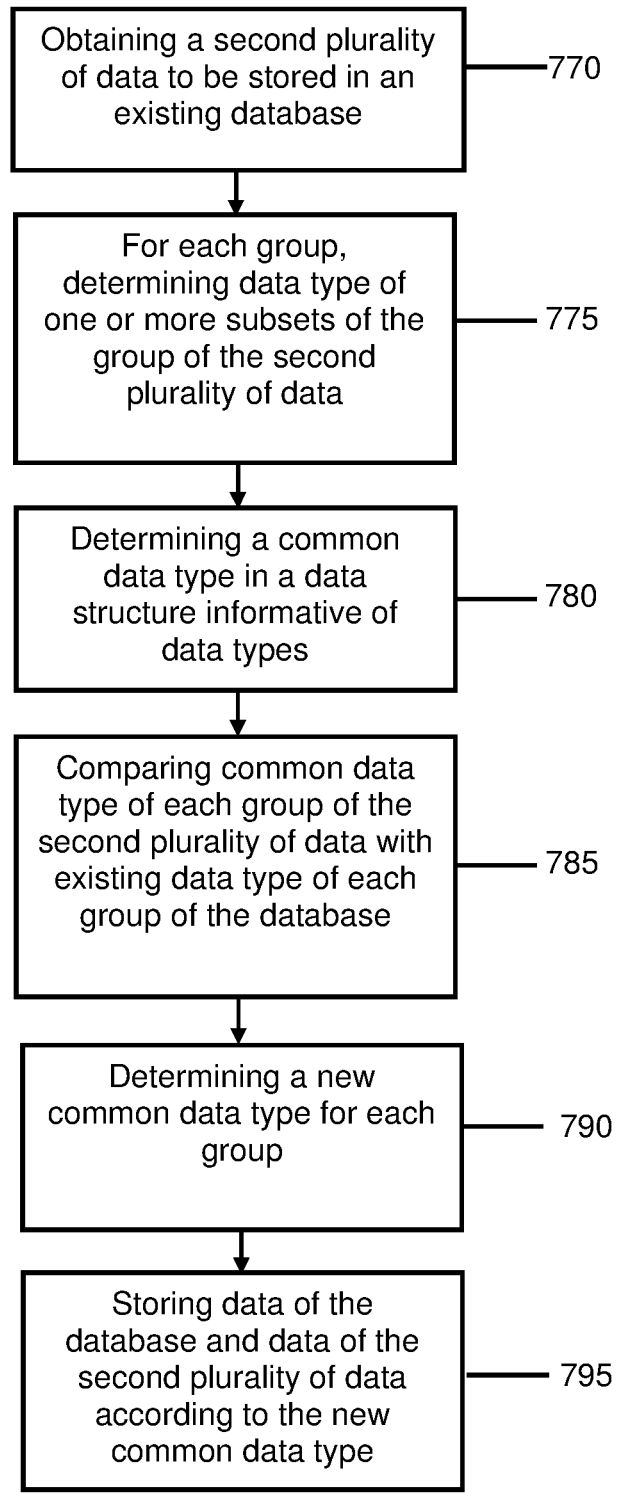
FIG. 7D describes a method of updating an existing database using operations described in FIG. 7A.

Attention is now drawn to FIG. 7D which describes a method of updating an existing database (using operations described in FIG. 7A).

Assume an existing database has already been created (see e.g. 760 in FIG. 7C). In the existing database, data is stored per group $G_i$ according to data type $D_{Gi}$.

The method can comprise obtaining (operation 770) a second plurality of data (which comprises also data divided into a plurality of groups $G'_i$). It is assumed that data of group $G'_i$ is to be stored with data of group $G_i$ (because this corresponds to the same group, for example because this is the same $i^{th}$ column or row in the second second plurality of data and in the database—see below the case in which the number of groups in not the same).

The method can comprise, for each group $G'_i$ of the second plurality of data, determining (operation 775—similar to operation 510 of FIG. 5) data type of one or more subsets of each group $G'_i$.

The method can comprise, for each group $G'_i$, inputting all data types of all subsets of the group in the data structure to find a common data type $DT_{G'i}$ for each group $G'_i$ of the second plurality of data (operation 780 similar to operation 720).

The method can comprise comparing (operation 785) common data type $DT_{G'i}$ of each group $G'_i$ of the second plurality of data with current data type $DT_{Gi}$ of each group $G_i$ of the existing database.

If this comparison shows a difference, the method can comprise determining (operation 790) a new common data type $DT'_{Gi}$ which is adapted both for data type $DT_{Gi}$ and for data type $DT_{G'i}$.

This determination can be performed using the method described in FIG. 2, which provides a new common data type $DT'_{Gi}$ which is optimized for storage.

The method can comprise (operation 795) storing (for each group) data of the database and data of the second plurality of data according to the new common data type $DT'_{Gi}$ in the same group of a database (which can be the same database in which an update has been performed, or a new database).

If the second plurality of data comprises more groups than the existing database, then the additional group of the second plurality of data will cause creation of a new group in the database.

Creation of a new group can be carried out similarly to any method described in the present application in which a new database is created.

If the second plurality of data comprises less groups than the existing database, then only the groups which are common to the second plurality of data and to the existing database will be handled e.g. according to the method of FIG. 7D.

Figure 8:
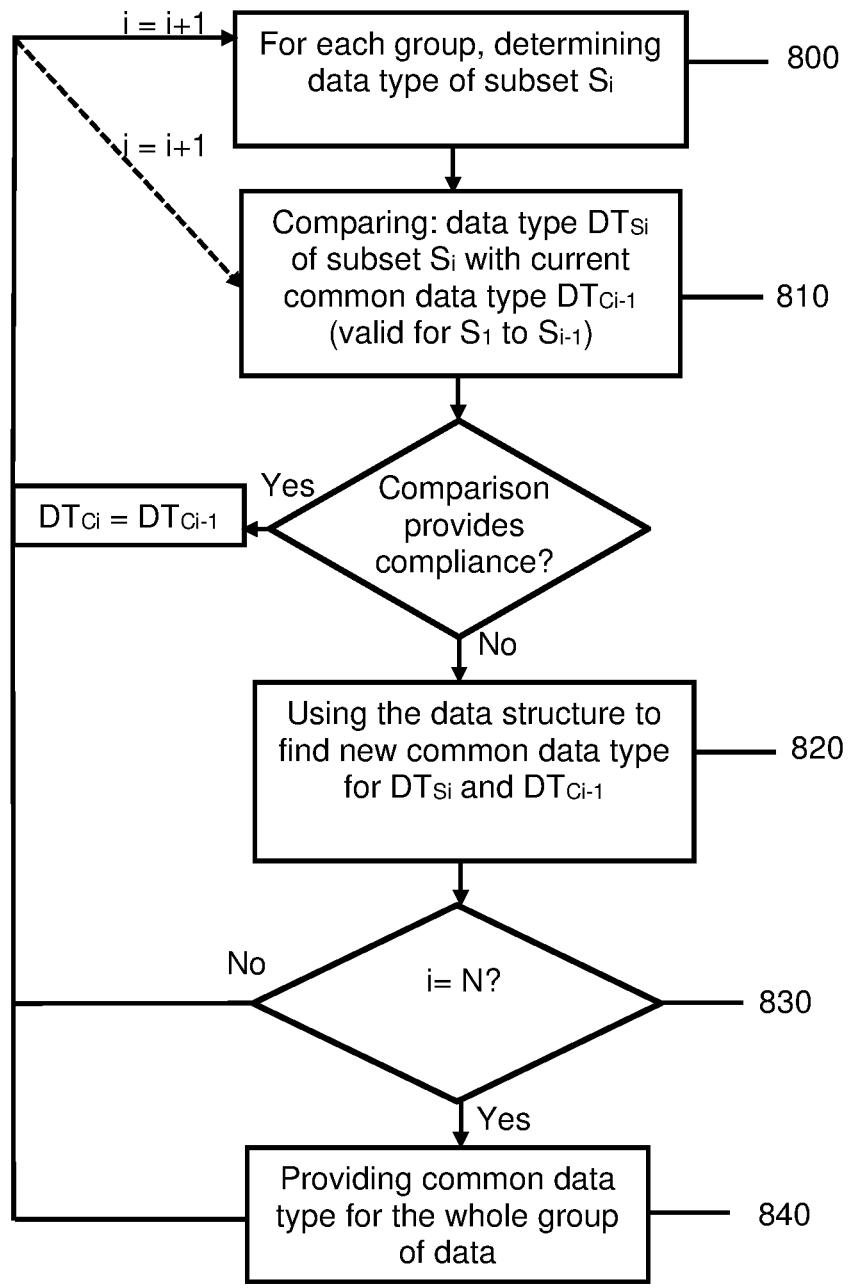
FIG. 8 illustrates another possible implementation of the method of FIG. 5.

Attention is drawn to FIG. 8, which represents another possible implementation of the method of FIG. 5.

The plurality of data comprises one or more groups $G_1$ to $G_N$. The system can divide each group into one or more subsets.

The method comprises determining (operation 800) data type $DT_{Si}$ for each subset of data $S_i$ of a group of data $G_i$ of a plurality of data (embodiments for performing this determination have been described with reference to operation 510 of FIG. 5).

The method can comprise attempting to determine a common data type of the group $G_i$ by analysing, progressively, data types of the subsets of data $S_i$ of this group $G_i$.

Operations will be described for one group, but each group can be treated independently according to this method (groups can be processed in parallel, or one after the other).

At the first iteration of the method (in which i=1), data type $DT_{S1}$ is temporarily considered as the current common data type $DT_{Ci}$ (in other words, $DT_{Ci}=DT_{S1}$).

Then the value of i is incremented by one.

The method comprises (operation 810), for current value of i, comparing data type $DT_{Si}$ with current common data type $DT_{Ci-1}$. Current common data type $DT_{Ci-1}$ is valid to represent all data of subsets $S_1$ to $S_{i-1}$.

Based on this comparison, the method can comprise:
- If this comparison shows that $DT_{Si}$ and $DT_{Ci-1}$ are the same, then the current common data type $DT_{Ci}$ (which will be valid to represent subsets $S_1$ to $S_i$) is set equal to $DT_{Ci-1}$ (in other words the value of the current common data type remains unchanged). If i is not equal to N, the value of i is then incremented by one and operations 800 and 810 are repeated. In some embodiments, the method returns to operation 810 because data type of each of subsets $S_1$ to $S_N$ has all been determined beforehand (that is to say that operation 800 was already performed N times before operations 810 to 840 are performed);
- If this comparison shows that $DT_{Si}$ and $DT_{Ci-1}$ are not the same, then the method comprises using the data structure (operation 820) to find a new current common data type $DT_{Ci}$ (which will be valid for subsets $S_1$ to $S_i$). Operation 820 can comprise providing to the data structure as an input data type $DT_{Si}$ and data type $DT_{Ci-1}$. A new current common data type $DT_{Ci}$ (valid for both $DT_{Si}$ and $DT_{Ci-1}$) can be found using the method described with reference to FIG. 2. According to some embodiments, $DT_{Ci}$ is selected so as to meet an efficiency criterion as explained above. If i is not equal to N, the value of i is then incremented by one and operations 800 and 810 are repeated. In some embodiments, the method returns to operation 810 because data type of each of subsets $S_1$ to $S_N$ has all been determined beforehand (that is to say that operation 800 was already performed N times before operations 810 to 840 are performed).

If i is equal to N (operation 830), current common data type $DT_{CN}$ is provided (operation 840). This common data type $DT_{CN}$ is adapted to represent all data of all subsets $S_1$ to $S_N$. In some embodiments, this common data type is the data type of the data structure which:
- is adapted to represent all data of all subsets $S_1$ to $S_N$; and
- meets the efficiency criterion (e.g. is a data type which is optimized for storage of all data of all subsets $S_1$ to $S_N$, among all data types of the data structure and/or optimizes query speed of the data in the database).

The method of FIG. 8 therefore provides a common data type for each group, by determining, in a sequential manner, for the common data type.

Figure 9:
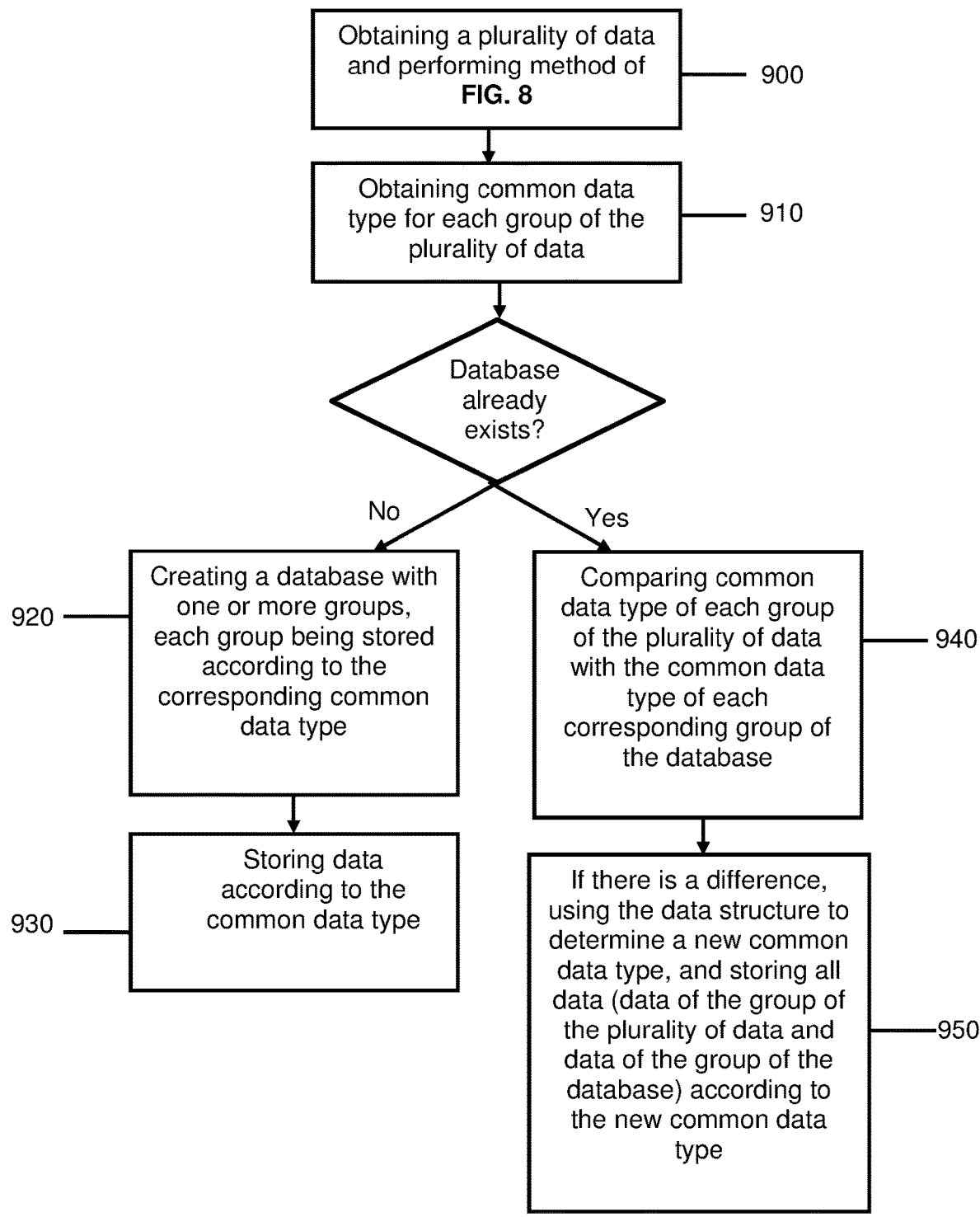
FIG. 9 describes a method of automatically storing data in a database using the method of FIG. 8.

Attention is now drawn to FIG. 9, which describes a method of automatically storing data in a database using the method of FIG. 8.

Assume a plurality of data is obtained comprising data divided into one or more groups. The method of FIG. 8 can be applied, in order to obtain, for each group $G_i$ of the data structure, a common data type $DT_{Gi}$ specific to this group $G_i$ (see operations 900, 910).

If a database does not yet exist, the method can comprise (operation 920) creating a new database, with groups similar to the plurality of data. Each group of the database is assigned with the common data type determined for the corresponding group of plurality of data. The plurality of data can thus be stored in the database according to the common data type relevant to its group (operation 930).

If a database already exists, which already stores data into one or more groups $G'_1$ to $G'_N$ according to a common data type ($DT_{G'1}$ to $DT_{G'N}$) specific to each group, the method can comprise:
- for each group $G_i$ of the plurality of data, comparing the common data type $DT_{Gi}$ of this group $G_i$ with the common data type of the corresponding group $G'_i$ of the database;
- if there is a match, then data of the group $G_i$ of the plurality of data can be stored in group $G'_i$ of the database according to the common data type $DT_{G'i}=DT_{Gi}$;
- if there is a difference, then a new common data type $DT'_{G'i}$ can be determined using the data structure which fits both data type $DT_{Gi}$ of the group $G_i$ of the plurality of data and common data type $DT_{G'i}$ of the group $G'_i$ of the database. The method of FIG. 2 can be used to find $DT'_{G'i}$. Based on this new common data type $DT'_{G'i}$, data already stored in group $G'_i$ of the database can be re-encoded, and data of the group $G_i$ of the plurality of data can be encoded, so that both data can be stored in a common group (of the existing database, or of a new database) with this new common data type $DT'_{G'i}$.

Figure 10:
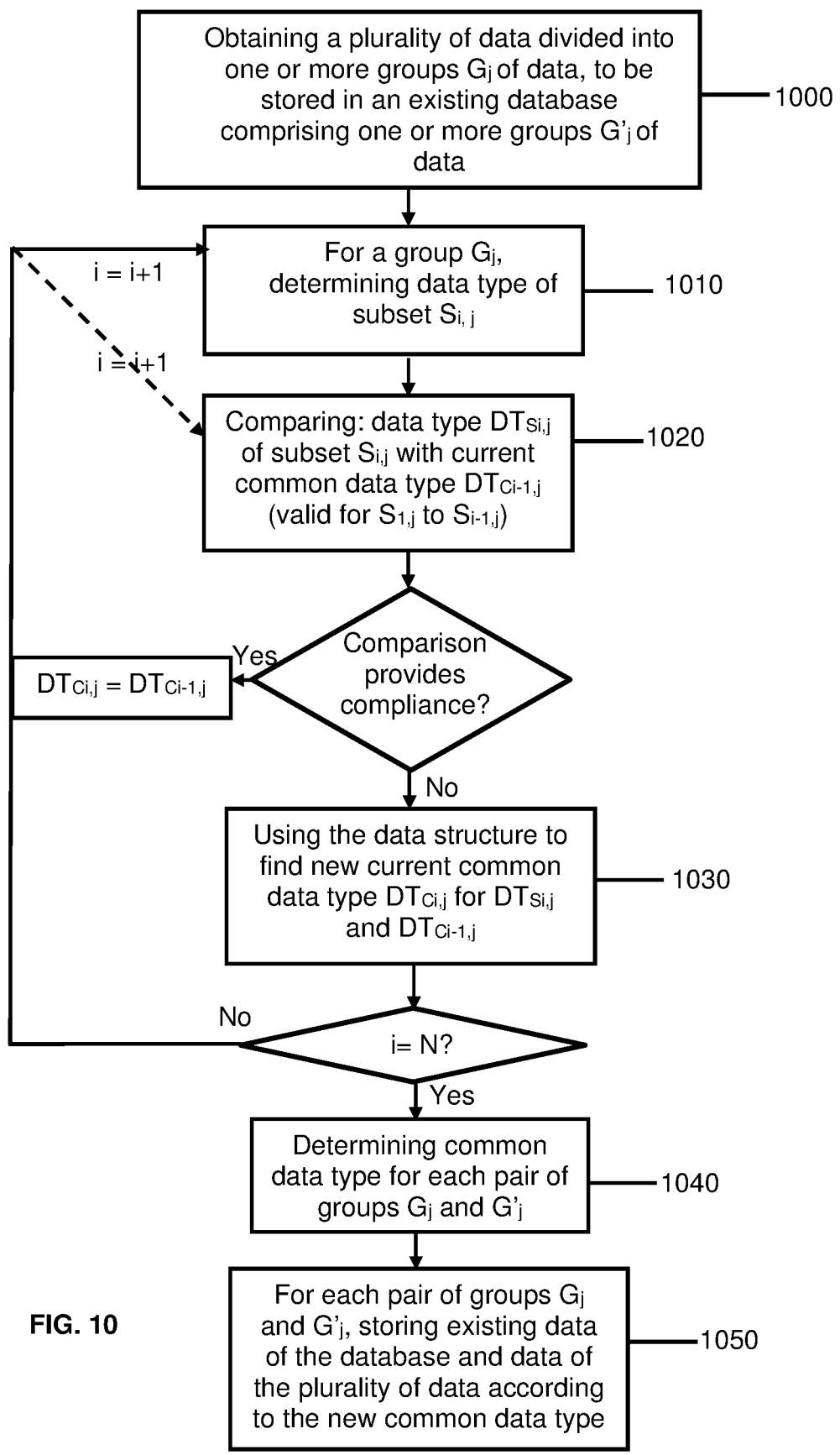
FIG. 10 describes another method of storing data.

Attention is now drawn to FIG. 10, which describes another method of storing data. A non-limitative illustration of the method is provided in FIG. 11.

Assume a database already exists in which one or more groups $G'_1$ to $G'_M$ are present. Each group $G'_j$ stores data according to data type $DT_{G'j}$.

Assume a plurality of data is obtained by the system. The plurality of data has to be stored together with data of the existing database in a common database (operation 1000). The plurality of data is also divided into one or more groups $G_1$ to $G_M$.

In some embodiments, it is possible that the plurality of data comprises less groups than the database—in this case only the common groups will be handled as explained hereinafter.

In other embodiments, it is possible that the plurality of data comprises more groups than the database—in this case the common groups will be handled as explained hereinafter, and the additional groups of the plurality of data can yield to the creation of new groups in the database, using one or more methods described above (see e.g. FIG. 9, which describes a method of creating a database which can be used also for creating new groups in an existing database).

Each group $G_j$ of the data structure can be divided into a plurality of subsets $S_{i,j}$ (as already explained above) by the system.

The method can comprise determining (operation 1010) data type of each subset $S_{i,j}$ (see e.g. operation 510 in FIG. 5 for possible embodiments) of each group $G_j$. This determination can be performed beforehand for all subsets $S_{i,j}$ of the group $G_j$, or can be performed progressively each time a new subset $S_{i,j}$ is analysed.

A basic principle of the method is to attempt to determine, in a progressive way, a common data type which is valid both for the subsets of data of group $G_j$, and for data of the corresponding group $G'_j$ in the database (currently stored according to data type $DT_{G'j}$).

The method can comprise, for each group $G_j$ of the plurality of data, comparing:
- data type $DT_{Si,j}$ of the subset $S_{i,j}$,
  with
- a current common data type $DT_{Ci-1,j}$, which is adapted to represent both data of subsets $S_{1,j}$ to $S_{i-1,j}$ and data of data type $D_{G'j}$.

In other words, $DT_{Ci-1,j}$ is the current estimation of the common data type (for both data of group $G_j$ of the data structure and for data of group $G'_j$ of the database) when only subsets $S_{1,j}$ to $S_{i-1,j}$ of group $G_j$ of the data structure have been processed. At the initialization of the method, that is to say for i=1, $DT_{C0,j}$ is set equal to $DT_{G'j}$ (since no subset of group $G_j$ of the data structure has been yet analysed).

If there is a match of the comparison mentioned above, then the current common data type $DT_{Ci-1,j}$ does not need to be modified, and therefore $DT_{Ci,j}=DT_{Ci-1,j}$. The value of i is incremented by one and the method returns to operation 1010 or to operation 1020 (the method returns to operation 1020 in case the data type of the subsets of the plurality of data has been already determined beforehand).

If there is a difference in the comparison mentioned above, the method can comprise using (1030) the data structure to determine a new common data type $DT_{Ci,j}$ which complies both with the data type $DT_{Si,j}$ of the subset $S_{i,j}$, and with the previous estimation of the common data type $DT_{Ci-1,j}$. This new common data type can meet the efficiency criterion as mentioned above. The method of FIG. 2 can be used for this purpose.

The value of i is incremented by one and the method returns to operation 1010 or to operation 1020 (the method returns to operation 1020 in case the data type of the subsets of the plurality of data has been already determined beforehand).

Once all the subsets of the group $G_j$ have been processed (which means that i=N), a common data type $DT_{CN,j}$ is obtained, which is adapted to represent both all existing data of the group $G'_j$ of the database and all data of the group $G_j$ of the plurality of data.

Therefore, all this data of group $G'_j$ and of group $G_j$ can be processed to be encoded (or re-encoded) according to this common data type $DT_{CN,j}$, and can be stored in the same database.

As already mentioned above, the database can be the existing database which is updated, or a new database which comprises both data of the old database, and data of the data structure.

Figure 11:
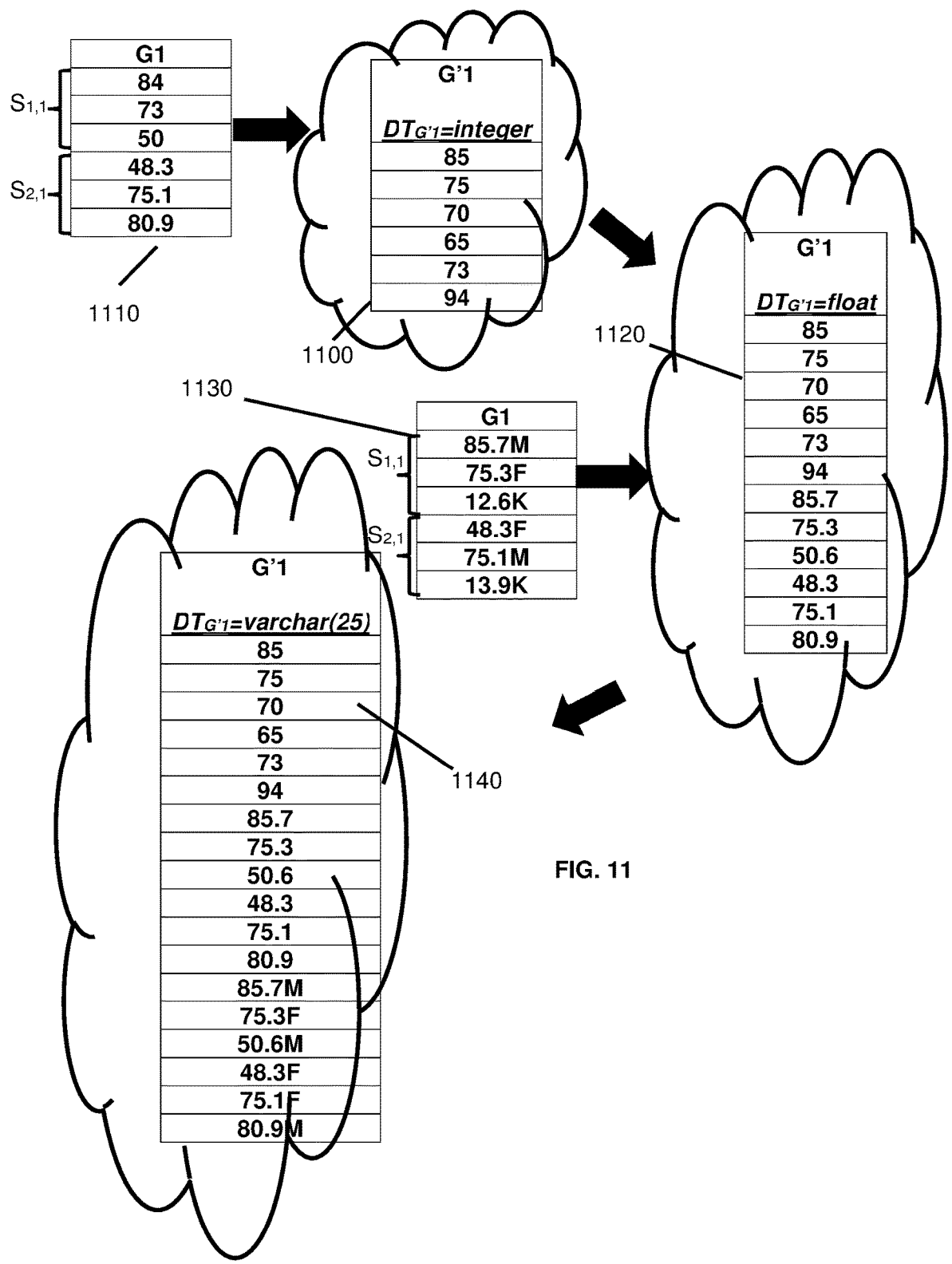
FIG. 11 provides a non-limitative example of the method of FIG. 10.

It has to be noted that the operations described in FIG. 11 can be performed in various different orders.

For example, in some embodiments, all the groups of the plurality of data can be processed simultaneously (operations 1010 to 1050 can be performed therefore in parallel for the different groups of the data structure).

In other embodiments, each group of the plurality of data is processed one after the other according to the method of FIG. 10.

Attention is drawn to FIG. 11 which provides a non-limitative example of the method of FIG. 10.

Assume an existing database 1100 stores data into a single group $G'_1$. The data type of this group $G'_1$ is an integer. For example, a user stores data representative of a weight (in Kg) of a person.

Assume a plurality of data 1110 is provided by the user, which comprises one group $G_1$. Instead of storing only integer for the weight, the user now stores at least some of the data according to a float representation (that is to say that he stores not only the weight in Kg but also the weight in grams).

Using the method of FIG. 10:
- assume group $G_1$ is divided into two subsets $S_{1,1}$, $S_{2,1}$ by the system. Data type $DT_{S1,1}$ of subset $S_{1,1}$ is determined as "integer". It appears that the existing data type $DT_{G'1}$ of the database complies with data type $DT_{S1,1}$ of $S_{1,1}$. Therefore, the current common data type (which would correspond to "$DT_{C1,1}$" in the method of FIG. 10) remains "integer";
- For subset $S_{2,1}$, it appears that the current common data type "$DT_{C1,1}$" is not the same as data type $DT_{S2,1}$ ("float") of $S_{2,1}$. The data structure is used to find a new common data type "$DT_{C2,1}$" which covers both "$DT_{C1,1}$=integer" and "$DT_{S2,1}$=float" (and which is optimized for storage). The method of FIG. 2 can be used. It appears that data type "float" is common to "integer" and "float".

Since all subsets of group $G_1$ have been processed, it appears that data type "$DT_{C2,1}$=float" is adapted both for group $G_1$ and group $G'_1$.

Therefore, both data of group $G_1$ and both data of group $G'_1$ can be represented according to this data type and can be stored in a new or updated group $G'_1$ of a database 1120 (this new group $G'_1$ can correspond to group $G'_1$ of the existing database which was updated, or to a new group $G'_1$ of a new database which was created).

Therefore, the method offers automatic storage of the new data which is transparent to the user and is efficient (for storage and/or query speed).

Assume a plurality of data 1130 is provided by the user. Instead of storing only an integer for the weight, the user now stores a character representative of the identity: "M" for male, "F" for female, and "K" for kids.

One can understand that this plurality of data 1130 cannot be stored as such in the existing database 1120, since group $G'_i$ only stores data according to a float representation. As explained hereinafter, the method is able to automatically cope with this problem without requiring the intervention of the user.

Using the method of FIG. 10:
- assume group $G_1$ of the plurality of data 1130 is divided into two subsets $S_{1,1}$, $S_{2,1}$ by the system. Data type $DT_{S1,1}$ of subset $S_{1,1}$ is identified as varchar(5). It appears that the existing data type $DT_{G'1}$ ("float") of the database 1120 is not the same as data type $DT_{S1,1}$ ("varchar(5)") of $S_{1,1}$. The data structure is used to find a common data type $DT_{0,1}$ which is optimized for storage. It appears that data type "varchar(25)" is common to "float" and "varchar(5)". Therefore, $DT_{C1,1}$=varchar(25).
- The method moves to subset $S_{2,1}$ and identifies its data type $DT_{S2,1}$ as equal to "varchar(5)". It appears that the current common data type "$DT_{C1,1}$=varchar(25)" is not the same as data type "$DT_{S2,1}$=varchar(5)" of $S_2$. Therefore, the data structure is searched or queried, and it appears that "varchar(25)" complies both with $DT_{C1,1}$ and $DT_{S2,1}$ Therefore, $DT_{C2,1}$=varchar(25).

Since all subsets of group $G_1$ have been processed, it appears that data type "$DT_{C2,1}$=varchar(25)" is adapted both for group $G_1$ and group $G'_1$. Therefore, both data of group $G_1$ and both data of group $G'_1$ can be represented according to this data type and can be stored in a new group $G'_1$ of a database 1140 (this new group $G'_1$ can correspond to group G'$_1$ of the existing database 1120 which was updated, or to a new group G'$_1$ of a new database which was created).

As shown in this example, the method allows repetitively updating (if necessary) the data type of the database, without requiring checking at each time all the previous data types that were inserted in the database. This is in particular due to the fact that the data structure is built to provide, for any query of two data types which are not the same, a broader data type. Therefore, this ensures that over time, any update of the data type associated with the database will comply with all previous data already inserted in the database.

In a particular example, the data structure is a tree (e.g decision tree). In particular, it is a decision tree which can be searched only according to one direction.

Figure 12A:
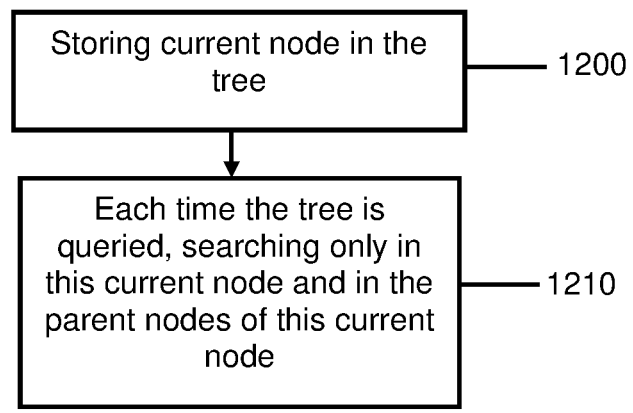
FIG. 12A describes a method usable for storing data and in which a decision tree is used.

This is shown in the non-limitative example of FIG. 12A.

The method comprises storing the current node in the decision tree (operation 1200), which corresponds to the current data type which is identified at this stage as compliant for storing data that have been analyzed.

Each time an update of the database has to be performed (and therefore the decision tree has to be searched or queried), the decision tree allows a search or a query only according to one direction, that it to say only in the current node, or towards the parent nodes of the current node (operation 1210).

Since the decision tree is built such that parent nodes represent broader data type category than children nodes, the data type output by the decision in response to a query can be either the same data type, or a broader one. As a consequence, the data type output by the decision tree will always comply with all data processed until now.

Figure 12B:
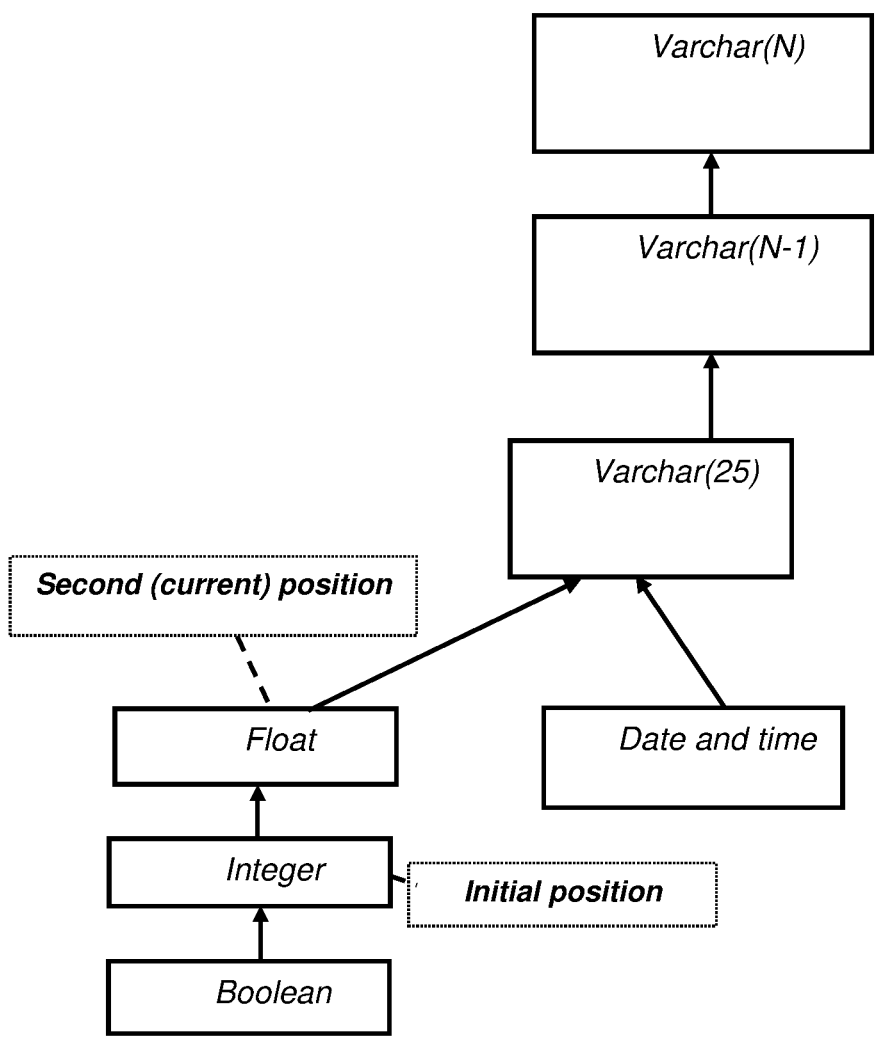
FIG. 12B provides a non-limitative example of the method of FIG. 12A.

An example is shown in FIG. 12B. As shown, the initial position in the decision tree was node "integer". Then the decision tree was queried, and the current position moved to "float". Therefore, upon a new query, only parent nodes of node "float" and node "float" itself will be searched or queried.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method comprising, by a processor and memory circuitry (PMC):
obtaining at least one group of data to be stored in a database, wherein the at least one group of data is informative of a field, wherein the at least one group of data comprises different data associated with the field, and is represented according to different data types,
obtaining a data structure informative of one or more hierarchical links between a plurality of data types according to which data can be represented for their storage, wherein the data structure is usable to determine, for at least a first data type and a second data type among said plurality of data types, a given data type which is adapted to represent at least both data of the first data type and data of the second data type for their storage,
for the at least one group of data, which comprises one or more subsets of data S1 to SN:
for each subset of data S1 to SN, determining a given data type which is adapted to represent said subset of data for its storage, and
using the given data type of each subset of data S1 to SN and the data structure to determine a common data type which is adapted to represent all data, or at least part thereof, belonging to subsets of data S1 to SN, for their storage, thereby facilitating storing the at least one group of data in a database according to this common data type.

2. The method of claim 1, wherein the data structure is usable to determine, for at least a first data type and a second data type among said plurality of data types, a given data type which is adapted to represent at least both data of the first data type and data of the second data type for their storage according to an efficiency criterion, wherein the efficiency criterion takes into account at least one of:
a storage size for representing both data of the first data type and data of the second data type in a database, and
a query speed for searching data of the first data type and data of the second data type in a database.

3. The method of claim 1, comprising storing data of the at least one group of data according to the common data type.

4. The method of claim 1, comprising, for the at least one group of data which comprises a plurality of subsets of data S1 to SN:
for each subset Si, with i from 1 to N, performing a data type determination comprising:
for subset S1, determining a data type adapted to represent data of subset S1 for its storage,
for i>1, determining a data type adapted to represent data of subset Si for its storage, wherein, when this data type is not adapted to represent data of at least one subset Sj, with j<i, using the data structure to determine a new data type which is adapted to represent both data of subsets Si and Sj for their storage,
based on the data type determination, providing a common data type which is adapted to represent all data of subsets S1 to SN for their storage.

5. The method of claim 1, comprising, by the PMC:
obtaining:
- a database comprising at least one first group of data,
- at least one second group of data which has to be stored together with data of the at least one first group of data, for the at least one second group of data, which comprises a plurality of subsets of data S1 to SN:
- for each subset of data S1 to SN, determining a given data type which is adapted to represent said subset of data, and
- using the given data type of each subset of data S1 to SN and the data structure to determine a common data type which is adapted to represent the at least one second group of data and the at least one first group of data, for storing the at least one second group of data and the at least one first group of data according to the common data type.

6. The method of claim 5, comprising:
storing the at least one second group of data and the at least one first group of data according to the common data type in a same group of data of the database.

7. The method of claim 1, comprising, by the PMC:
obtaining:
- a database comprising at least one first group of data associated with a first given data type,
- at least one second group of data which has to be stored together with the at least one first group of data, and for the at least one second group of data which comprises a plurality of subsets of data S1 to SN:
for each subset Si, with i from 1 to N:
- determining a data type adapted to represent data of subset Si for its storage, wherein, when this data type is not adapted to represent data of a current common data type, using the data structure to determine a data type which is adapted to represent both data of subset Si and data of the current common data type, and assigning this data type as current common data type,
- wherein for i=1, the current common data type is equal to the first given data type, and
- providing the current common data type determined for i=N, which is adapted to represent the at least one first group of data and the at least one second group of data, for their storage according to said current common data type.

8. The method of claim 7, comprising storing the at least one second group of data and the at least one first group of data according to the current common data type determined for i=N, thereby providing a database storing both the at least one second group of data GDS and the at least one first group of data in a same group of data.

9. The method of claim 1, wherein the plurality of data different data types of the at least one group of data comprises at least one of:
- Integer;
- Float;
- Date;
- Boolean;
- Time;
- Date and Time;
- String;
- String with a predefined number of characters.

10. A method comprising, by a processor and memory circuitry (PMC):
obtaining a plurality of data, wherein the plurality of data comprises one or more groups of data,
obtaining a data structure informative of a plurality of data types according to which data can be represented for their storage, wherein the data structure is usable to determine, for at least a first data type and a second data type among said plurality of data types, a given data type which is adapted to represent at least both data of the first data type and data of the second data type for their storage, for at least one first group of data of the plurality of data, which comprises a plurality of subsets of data S1 to SN:
- for subset S1, determining a current common data type adapted to represent data of subset S1 for its storage,
- repeatedly performing, for each subset Si, with i from 2 to N:
  - determining a data type adapted to represent data of subset Si for its storage, wherein, when this data type is not adapted to represent data of the current common data type, using the data structure to determine a given data type which is adapted to represent both data of subset Si and data of the current common data type, and assigning this given data type as current common data type,
- providing the current common data type determined for i=N, which is adapted to represent data of the at least one first group of data for their storage, thereby facilitating storing the at least one first group of data in a database according to this common data type, or
repeatedly performing, for each subset Si, with i from 1 to N,
- determining a data type adapted to represent data of subset Si for its storage, wherein when this data type is not adapted to represent data of a current common data type, using the data structure to determine a given data type which is adapted to represent both data of subset Si and data of the current common data type, and assigning this given data type as current common data type,
- wherein for i=1, the current common data type corresponds to a data type of a second group of data of an existing database,
- providing the current common data type determined for i=N, which is adapted to represent said second group of data and said at least one first group of data for their storage according to said current common data type, thereby facilitating storing the second group of data with the at least one first group of data of the database according to this common data type.

11. The method of claim 10, wherein the data structure comprises a tree comprising a plurality of nodes each associated with a data type,
- wherein a parent node of a given node corresponds to a data type which is broader than a data type of said given node,
- wherein each time the tree is searched or queried, a given node associated with a given data type output by the search is stored,
- wherein a subsequent search or query in the tree is allowed only in this given node or in parent nodes of this given node.

12. A system comprising a processor and memory circuitry (PMC) configured to:
obtain at least one group of data to be stored in a database, wherein the at least one group of data is informative of a field, wherein the at least one group of data comprises different data associated with the field, and is represented according to different data types, obtain a data structure informative of one or more hierarchical links between a plurality of data types according to which data can be represented for their storage, wherein the data structure is usable to determine, for at least a first data type and a second data type among said plurality of data types, a given data type which is adapted to represent at least both data of the first data type and data of the second data type for their storage, for the at least one group of data, which comprises one or more subsets of data S1 to SN:
for each subset of data S1 to SN, determine a given data type which is adapted to represent said subset of data for its storage, and
use the given data type of each subset of data S1 to SN and the data structure to determine a common data type which is adapted to represent all data, or at least part thereof, belonging to subsets of data S1 to SN for their storage, thereby facilitating storing the at least one group of data in a database according to this common data type.

13. The system of claim 12, wherein the data structure is usable to determine, for at least a first data type and a second data type among said plurality of data types, a given data type which is adapted to represent at least both data of the first data type and data of the second data type for their storage according to an efficiency criterion,
wherein the efficiency criterion takes into account at least one of:
a storage size for representing both data of the first data type and data of the second data type in a database, and
a query speed for searching data of the first data type and data of the second data type in a database.

14. The system of claim 12, configured to store data of the at least one group of data according to the common data type.

15. The system of claim 12, configured to, for the at least one group of data which comprises a plurality of subsets of data S1 to SN:
for each subset Si, with i from 1 to N, perform a data type determination comprising:
for subset S1, determining a data type adapted to represent data of subset S1 for its storage,
for i>1, determining a data type adapted to represent data of subset Si for its storage, wherein, when this data type is not adapted to represent data of at least one subset Sj, with j<i, using the data structure to determine a new data type which is adapted to represent both data of subsets Si and Sj for their storage,
based on the data type determination, provide a common data type which is adapted to represent all data of subsets S1 to SN for their storage.

16. The system of claim 12, configured to:
obtain:
a database comprising at least one first group of data,
at least one second group of data which has to be stored together with data of the at least one first group of data,
for the at least one second group of data, which comprises a plurality of subsets of data S1 to SN:
for each subset of data S1 to SN, determine a given data type which is adapted to represent said subset of data, and
use the given data type of each subset of data S1 to SN and the data structure to determine a common data type which is adapted to represent the second group of data and the first group of data, for storing the at least one second group of data and the at least one first group of data according to the common data type.

17. The system of claim 16, configured to:
store the at least one second group of data and the at least one first group of data according to the common data type in a same group of data of the database.

18. The system of claim 12, configured to:
obtain:
a database comprising at least one first group of data associated with a first given data type
at least one second group of data which has to be stored together with the at least one first group of data, and
for the at least one group of second data which comprises a plurality of subsets of data S1 to SN:
for each subset Si, with i from 1 to N:
determine a data type adapted to represent data of subset Si for its storage, wherein, when this data type is not adapted to represent data of a current common data type, use the data structure to determine a data type which is adapted to represent both data of subset Si and data of the current common data type, and assign this data type as current common data type,
wherein for i=1, the current common data type is equal to the first given data type, and
provide the current common data type determined for i=N, which is adapted to represent the at least one first group of data and the at least one second group of data, for their storage according to said current common data type.

19. The system of claim 18, configured to store the at least one second group of data and the at least one first group of data according to the current common data type determined for i=N, thereby providing a database storing both the at least one second group of data and the at least one first group of data in a same group of data.

20. A non-transitory storage device readable by a machine, tangibly embodying a program of instructions executable by the machine to perform:
obtaining at least one group of data to be stored in a database, wherein the at least one group of data is informative of a field, wherein the at least one group of data comprises different data associated with the field, and is represented according to different data types,
obtaining a data structure informative of one or more hierarchical links between a plurality of data types according to which data can be represented for their storage, wherein the data structure is usable to determine, for at least a first data type and a second data type among said plurality of data types, a given data type which is adapted to represent at least both data of at least the first data type and data of the second data type for their storage,
for the at least one group of data, which comprises one or more subsets of data S1 to SN:
for each subset of data S1 to SN, determining a given data type which is adapted to represent said subset of data for its storage, and
using the given data type of each subset of data S1 to SN and the data structure to determine a common data type which is adapted to represent all data, or at least part thereof, belonging to subsets of data S1 to SN for their storage, thereby facilitating storing the at least one group of data in a database according to this common data type.

* * * * *